US012625541B2

(12) United States Patent
Pignataro et al.

(10) Patent No.: US 12,625,541 B2
(45) Date of Patent: May 12, 2026

(54) SMART NETWORK INTERFACE CARDS (sNICs) OFFLOAD FOR IMPROVED SUSTAINABILITY

(71) Applicant: Cisco Technology, Inc., San Jose, CA (US)

(72) Inventors: Carlos Pignataro, Cary, NC (US); Nagendra Kumar Nainar, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 18/539,102

(22) Filed: Dec. 13, 2023

(65) Prior Publication Data

US 2025/0199600 A1 Jun. 19, 2025

(51) Int. Cl.
G06F 1/329 (2019.01)

(52) U.S. Cl.
CPC .................................... G06F 1/329 (2013.01)

(58) Field of Classification Search
CPC ...................................................... G06F 1/329
USPC ......................................................... 713/320
See application file for complete search history.

(56) References Cited

U.S. PATENT DOCUMENTS 5,307,265 A * 4/1994 Winans .................... H04L 69/00
704/8
5,680,430 A * 10/1997 Khutoryansky ......... H05G 1/36
378/11

6,175,884 B1 * 1/2001 Harriman .............. G06F 13/423
710/5
7,607,032 B1 * 10/2009 Marek ................... G06F 9/5094
713/300
2002/0078252 A1 * 6/2002 Fields, Jr. ........... G06F 13/1642
711/E12.024
2002/0131396 A1 * 9/2002 Knuutila .............. H03G 3/3047
370/349
2005/0270175 A1 * 12/2005 Peddie ............. G08G 1/096783
246/473 R (Continued)

OTHER PUBLICATIONS

Wang D., et al., "A Smart-NIC-Based Power-Proxy Solution for Reduced Power Consumption during Instant Messaging", 2010 IEEE Green Technologies Conference, Apr. 15-16, 2010, pp. 1-11.

(Continued)

*Primary Examiner* — Paul R. Myers
(74) *Attorney, Agent, or Firm* — Rutan & Tucker, LLP; Ravi Mohan; Marc A. McClain

(57) ABSTRACT

Devices, networks, systems, methods, and processes for offloading services for sustainability improvements are described herein. A device may receive one or more service requests corresponding to one or more services. The device may determine one or more energy profiles for one or more processing units based on a plurality of power consumption metrics of the one or more processing units. The device may assign execution of the one or more service requests to the one or more processing units based on corresponding energy profiles of the one or more processing units. Thus, the device may facilitate selective offloading and execution of services among different processing units. The device can optimize the offloading and execution of the services such that the services are executed with least power consumption, thereby improving sustainability of the device.

20 Claims, 12 Drawing Sheets

(56) References Cited

U.S. PATENT DOCUMENTS

| | | | | |
|---|---|---|---|---|
| 2006/0143486 | A1* | 6/2006 | Lamdan | G06F 1/3203 |
| | | | | 713/320 |
| 2007/0074216 | A1* | 3/2007 | Adachi | G06F 1/3203 |
| | | | | 718/102 |
| 2007/0296394 | A1* | 12/2007 | Landry | H04L 12/10 |
| | | | | 323/371 |
| 2009/0307698 | A1* | 12/2009 | Khatri | G06F 1/3203 |
| | | | | 718/102 |
| 2010/0107166 | A1* | 4/2010 | Topaloglu | G06F 9/5094 |
| | | | | 718/102 |
| 2011/0213991 | A1* | 9/2011 | Wolfe | G06F 9/5094 |
| | | | | 713/300 |
| 2012/0152618 | A1* | 6/2012 | Nadeau | G05B 19/0428 |
| | | | | 700/275 |
| 2013/0067014 | A1* | 3/2013 | Lau | H04L 51/226 |
| | | | | 709/207 |
| 2013/0275785 | A1* | 10/2013 | Katori | G06F 1/3225 |
| | | | | 713/320 |
| 2014/0201605 | A1* | 7/2014 | Kim | H04L 1/0057 |
| | | | | 714/799 |
| 2015/0261274 | A1 | 9/2015 | Ahnn et al. | |
| 2016/0049789 | A1* | 2/2016 | Ng | G01D 4/002 |
| | | | | 700/295 |
| 2016/0156225 | A1* | 6/2016 | Yang | H02J 13/00022 |
| | | | | 307/31 |
| 2016/0162004 | A1 | 6/2016 | Ljubuncic et al. | |
| 2016/0209900 | A1* | 7/2016 | Blayvas | G06F 1/3228 |
| 2016/0378570 | A1* | 12/2016 | Ljubuncic | G06F 9/5027 |
| | | | | 718/104 |
| 2017/0064003 | A1* | 3/2017 | Kubota | H04L 67/63 |
| 2017/0083383 | A1* | 3/2017 | Rider | G06F 9/4893 |
| 2018/0364928 | A1* | 12/2018 | Park | G06F 1/30 |
| 2020/0278892 | A1 | 9/2020 | Nainar et al. | |
| 2020/0312005 | A1 | 10/2020 | Desai et al. | |
| 2021/0314232 | A1 | 10/2021 | Nainar et al. | |
| 2022/0300312 | A1* | 9/2022 | Huss | G06F 9/5027 |
| 2022/0377137 | A1* | 11/2022 | Xu | H04L 67/12 |
| 2023/0195531 | A1* | 6/2023 | Gupta Hyde | G06F 1/3287 |
| | | | | 718/104 |
| 2023/0195538 | A1 | 6/2023 | Spoczynski et al. | |
| 2023/0251893 | A1 | 8/2023 | Rajagopal | |
| 2023/0327923 | A1* | 10/2023 | Yapici | H04L 25/03891 |
| 2023/0396920 | A1* | 12/2023 | Zhou | H04R 3/005 |
| 2024/0152194 | A1* | 5/2024 | Hsieh | G06F 1/26 |
| 2025/0147920 | A1* | 5/2025 | Kim | G06F 9/4856 |

OTHER PUBLICATIONS

International Search Report and Written Opinion for International Application No. PCT/US2024/058725, mailed Apr. 1, 2025, 17 Pages.

* cited by examiner

*FIG. 6*

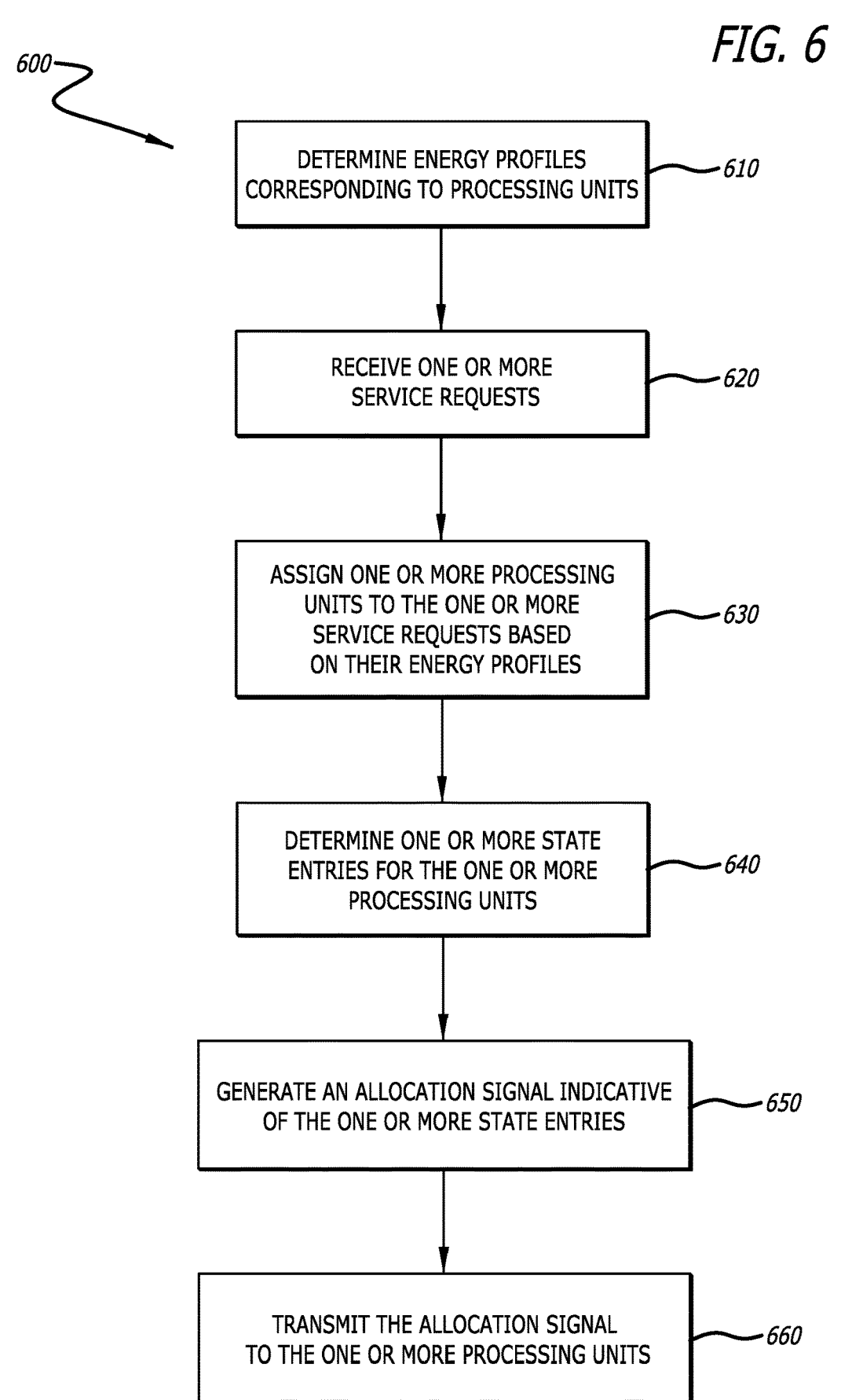

600

DETERMINE ENERGY PROFILES
CORRESPONDING TO PROCESSING UNITS — 610

RECEIVE ONE OR MORE
SERVICE REQUESTS — 620

ASSIGN ONE OR MORE PROCESSING
UNITS TO THE ONE OR MORE
SERVICE REQUESTS BASED
ON THEIR ENERGY PROFILES — 630

DETERMINE ONE OR MORE STATE
ENTRIES FOR THE ONE OR MORE
PROCESSING UNITS — 640

GENERATE AN ALLOCATION SIGNAL INDICATIVE
OF THE ONE OR MORE STATE ENTRIES — 650

TRANSMIT THE ALLOCATION SIGNAL
TO THE ONE OR MORE PROCESSING UNITS — 660

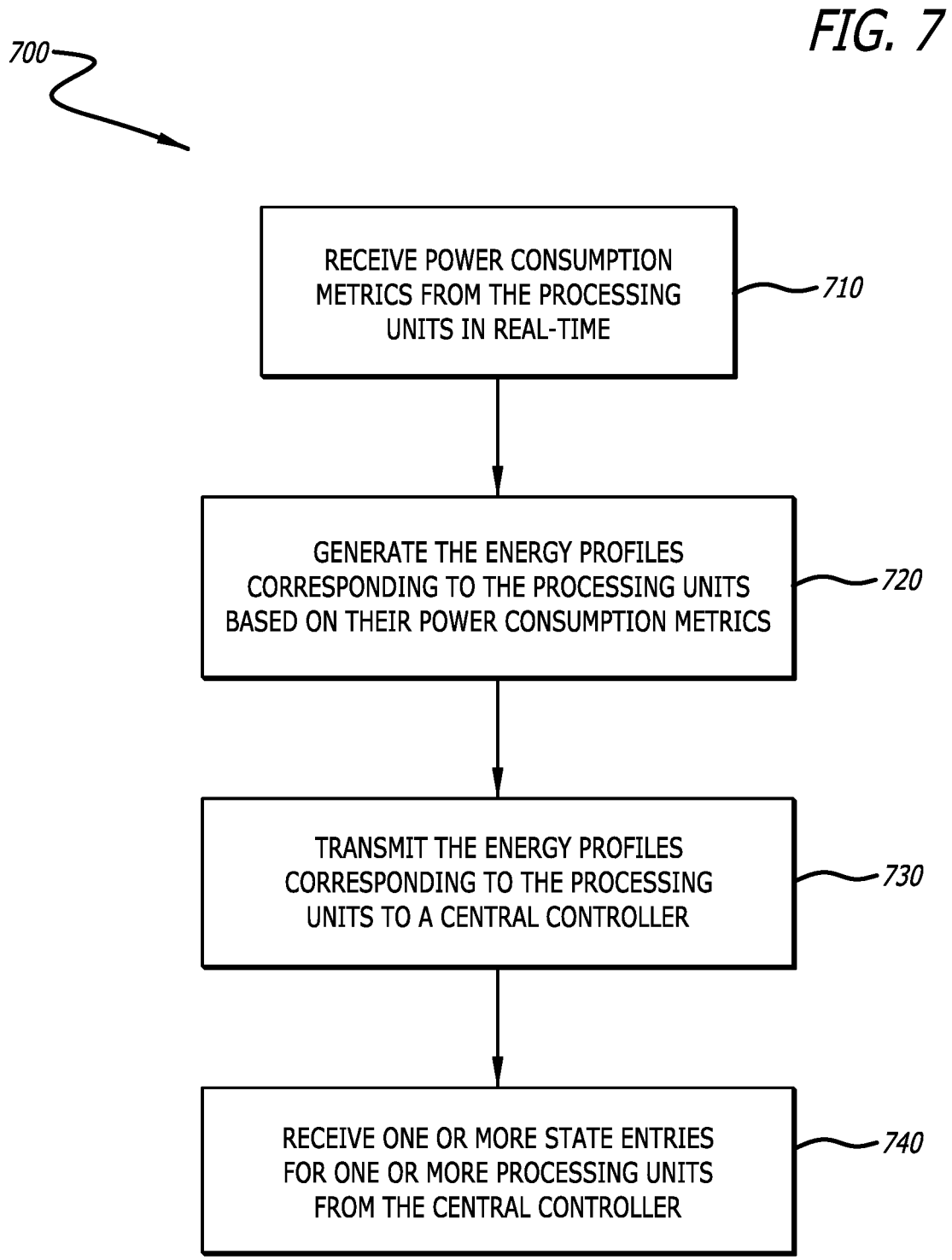

RECEIVE POWER CONSUMPTION METRICS FROM THE PROCESSING UNITS IN REAL-TIME ~ 710

GENERATE THE ENERGY PROFILES CORRESPONDING TO THE PROCESSING UNITS BASED ON THEIR POWER CONSUMPTION METRICS ~ 720

TRANSMIT THE ENERGY PROFILES CORRESPONDING TO THE PROCESSING UNITS TO A CENTRAL CONTROLLER ~ 730

RECEIVE ONE OR MORE STATE ENTRIES FOR ONE OR MORE PROCESSING UNITS FROM THE CENTRAL CONTROLLER ~ 740

*FIG. 8*

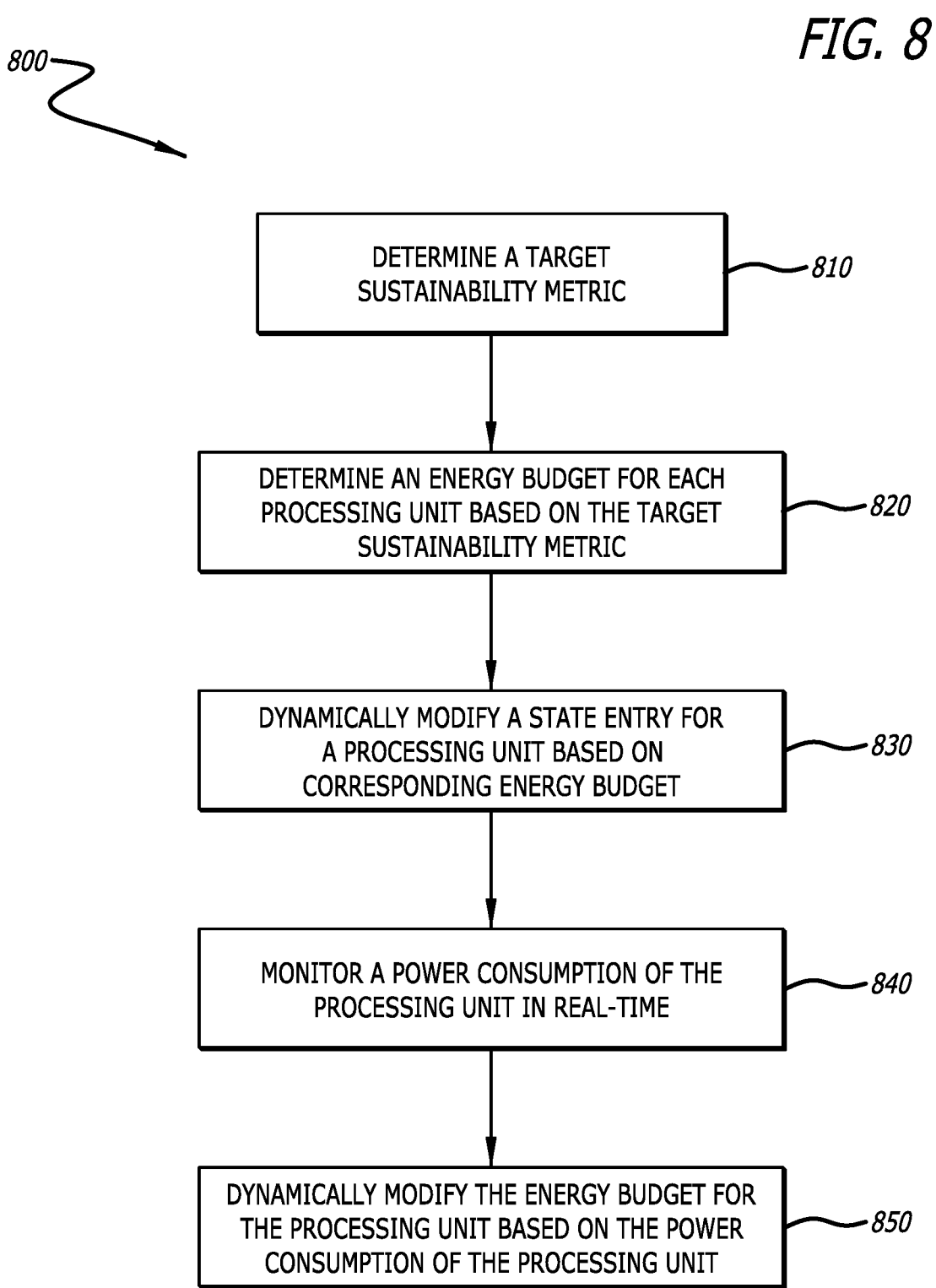

800

DETERMINE A TARGET SUSTAINABILITY METRIC — 810

DETERMINE AN ENERGY BUDGET FOR EACH PROCESSING UNIT BASED ON THE TARGET SUSTAINABILITY METRIC — 820

DYNAMICALLY MODIFY A STATE ENTRY FOR A PROCESSING UNIT BASED ON CORRESPONDING ENERGY BUDGET — 830

MONITOR A POWER CONSUMPTION OF THE PROCESSING UNIT IN REAL-TIME — 840

DYNAMICALLY MODIFY THE ENERGY BUDGET FOR THE PROCESSING UNIT BASED ON THE POWER CONSUMPTION OF THE PROCESSING UNIT — 850

900

EXECUTE A SERVICE REQUEST OF THE ONE OR MORE SERVICE REQUESTS — 910

GENERATE A MODIFIED DATA PACKET INCLUDING A MODIFIED HEADER — 920

GENERATE A MODIFIED ALLOCATION SIGNAL COMPRISING THE MODIFIED DATA PACKET — 930

TRANSMIT THE MODIFIED ALLOCATION SIGNAL TO THE ONE OR MORE PROCESSING UNITS — 940

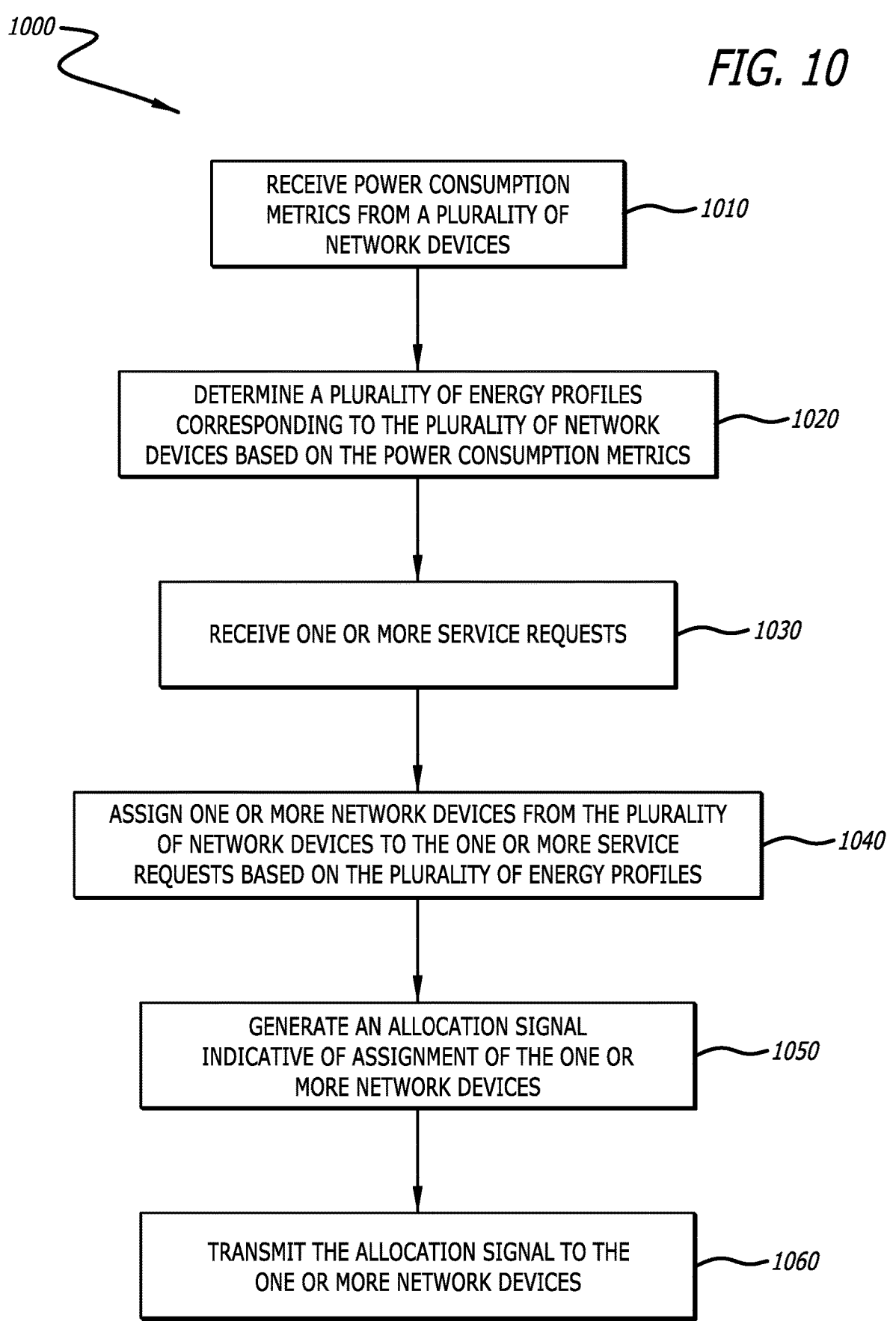

RECEIVE POWER CONSUMPTION METRICS FROM A PLURALITY OF NETWORK DEVICES ⟶ *1010*

DETERMINE A PLURALITY OF ENERGY PROFILES CORRESPONDING TO THE PLURALITY OF NETWORK DEVICES BASED ON THE POWER CONSUMPTION METRICS ⟶ *1020*

RECEIVE ONE OR MORE SERVICE REQUESTS ⟶ *1030*

ASSIGN ONE OR MORE NETWORK DEVICES FROM THE PLURALITY OF NETWORK DEVICES TO THE ONE OR MORE SERVICE REQUESTS BASED ON THE PLURALITY OF ENERGY PROFILES ⟶ *1040*

GENERATE AN ALLOCATION SIGNAL INDICATIVE OF ASSIGNMENT OF THE ONE OR MORE NETWORK DEVICES ⟶ *1050*

TRANSMIT THE ALLOCATION SIGNAL TO THE ONE OR MORE NETWORK DEVICES ⟶ *1060*

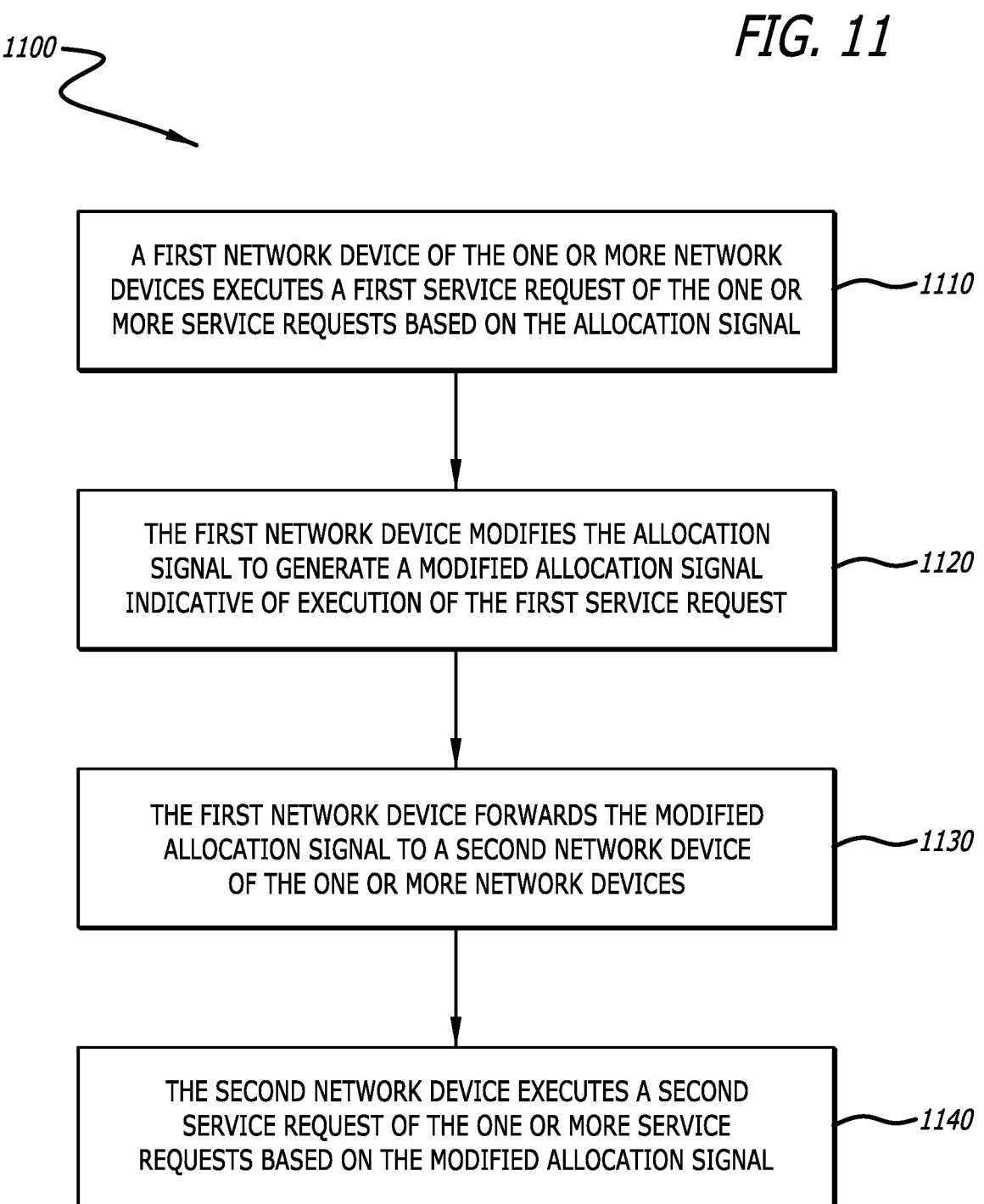

A FIRST NETWORK DEVICE OF THE ONE OR MORE NETWORK DEVICES EXECUTES A FIRST SERVICE REQUEST OF THE ONE OR MORE SERVICE REQUESTS BASED ON THE ALLOCATION SIGNAL ~*1110*

THE FIRST NETWORK DEVICE MODIFIES THE ALLOCATION SIGNAL TO GENERATE A MODIFIED ALLOCATION SIGNAL INDICATIVE OF EXECUTION OF THE FIRST SERVICE REQUEST ~*1120*

THE FIRST NETWORK DEVICE FORWARDS THE MODIFIED ALLOCATION SIGNAL TO A SECOND NETWORK DEVICE OF THE ONE OR MORE NETWORK DEVICES ~*1130*

THE SECOND NETWORK DEVICE EXECUTES A SECOND SERVICE REQUEST OF THE ONE OR MORE SERVICE REQUESTS BASED ON THE MODIFIED ALLOCATION SIGNAL ~*1140*

SMART NETWORK INTERFACE CARDS (sNICs) OFFLOAD FOR IMPROVED SUSTAINABILITY

The present disclosure relates to digital networks. More particularly, the present disclosure relates to offloading services to processing units or devices in a digital network.

BACKGROUND

In modern digital networks, Smart Network Interface Cards (sNICs) comprising Application Specific Integrated Circuits (ASICs) and Field Programmable Gate Arrays (FPGAs) can function as accelerators within devices in the digital networks. These sNICs can optimize the digital networks wherein services and complex functions, for example, cloud native services can be offloaded to the sNICs for execution. The sNICs also support hypervisor functionality, allowing them to create and manage virtual machines (VMs) and execute microservices. Some digital networks also allow Router-on-NIC by offloading routing or switching functions to the sNICs. Offloading routing or switching functions to the sNICs not only simplifies architectures of the digital networks but also optimizes routing and switching performances, thereby resulting in more efficient data traffic management.

The sNICs provide network operators with various options for executing the services and functions. For instance, cloud native services and functions such as packet forwarding can be executed in a control place, can be forwarded to a forwarding plane, can be executed in Data Processing Units (DPUs) or Network Processing Units (NPUs) integrated into line cards, or can be executed by the sNICs in the line cards. By offloading the services to the sNICs, the network operators can improve performance of the digital networks by reducing response times, thereby creating more responsive and efficient digital networks.

However, a decision of offloading or executing the services and the functions has significantly different effects on performance and energy efficiencies of the digital networks. The choice of processing units, devices, or accelerators can impact the efficiency of execution of the services in the digital networks as well as the energy consumption of the digital networks. Further, different services and functions may execute in highly varied and non-linear ways when offloaded to different processing units, devices, or accelerators. This makes it essential to consider unique characteristics of each service and function before executing or offloading on the different processing units, devices, or accelerators. Therefore, there is a need to selectively execute or offload the services and functions on the different processing units, devices, or accelerators in the devices in the digital networks such that the performance and energy efficiencies of the digital networks are balanced and optimized.

SUMMARY OF THE DISCLOSURE

Systems and methods for offloading services to processing units or devices in a digital network in accordance with embodiments of the disclosure are described herein. In some embodiments, a device includes a processor, a memory communicatively coupled to the processor, and a sustainable offloading logic. The logic is configured to determine a plurality of energy profiles corresponding to a plurality of processing units, receive one or more service requests, assign one or more processing units from the plurality of processing units to the one or more service requests based on the plurality of energy profiles, determine one or more state entries for the one or more processing units, and generate an allocation signal indicative of the one or more state entries.

In some embodiments, the sustainable offloading logic is further configured to receive a plurality of power consumption metrics from the plurality of processing units in real-time, and generate the plurality of energy profiles corresponding to the plurality of processing units based on the plurality of power consumption metrics.

In some embodiments, the plurality of energy profiles are indicative of power consumption of the plurality of processing units per service request.

In some embodiments, the one or more state entries are indicative of a number of service requests to skip and a number or service requests to execute.

In some embodiments, the sustainable offloading logic is further configured to transmit the allocation signal to the one or more processing units through a data plane.

In some embodiments, the one or more processing units execute the one or more service requests based on the one or more state entries indicated by the allocation signal.

In some embodiments, the sustainable offloading logic is further configured to transmit the plurality of energy profiles corresponding to the plurality of processing units to a central controller, and receive the one or more state entries for the one or more processing units from the central controller.

In some embodiments, the sustainable offloading logic is further configured to determine a target sustainability metric, and determine an energy budget for each processing unit of the plurality of processing units based on the target sustainability metric.

In some embodiments, the sustainable offloading logic is further configured to monitor a power consumption of a processing unit in real-time.

In some embodiments, the sustainable offloading logic is further configured to dynamically modify the energy budget for the processing unit based on the power consumption of the processing unit.

In some embodiments, the sustainable offloading logic is further configured to dynamically modify a state entry of the one or more state entries for the processing unit based on the energy budget.

In some embodiments, the sustainable offloading logic is further configured to execute a service request of the one or more service requests.

In some embodiments, the sustainable offloading logic is further configured to modify a header of a data packet indicative of the service request, and generate a modified data packet including the header, wherein the modified data packet is indicative of execution of the service request.

In some embodiments, the sustainable offloading logic is further configured to generate a modified allocation signal including the modified data packet, and transmit the modified allocation signal to the one or more processing units.

In some embodiments, a device includes a processor, a memory communicatively coupled to the processor, and a sustainable offloading logic. The logic is configured to receive a plurality of power consumption metrics from a plurality of network devices, determine a plurality of energy profiles corresponding to the plurality of network devices based on the plurality of power consumption metrics, receive one or more service requests, assign one or more network devices from the plurality of network devices to the one or more service requests based on the plurality of energy profiles, generate an allocation signal indicative of assignment of the one or more network devices, and transmit the allocation signal to the one or more network devices.

In some embodiments, a first network device of the one or more network devices executes a first service request of the one or more service requests based on the allocation signal.

In some embodiments, the first network device modifies the allocation signal to generate a modified allocation signal indicative of execution of the first service request, and forwards the modified allocation signal to a second network device of the one or more network devices.

In some embodiments, the second network device executes a second service request of the one or more service requests based on the modified allocation signal.

In some embodiments, a method includes determining a plurality of energy profiles corresponding to a plurality of processing units, receiving one or more service requests, assigning one or more processing units from the plurality of processing units to the one or more service requests based on the plurality of energy profiles, determining one or more state entries for the one or more processing units, generating an allocation signal indicative of the one or more state entries, and transmitting the allocation signal to the one or more processing units.

In some embodiments, a method further includes determining a target sustainability metric, determining an energy budget for each processing unit of the plurality of processing units based on the target sustainability metric, and dynamically modifying a state entry of the one or more state entries associated with a processing unit of the one or more processing units based on corresponding energy budget.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 6 is a flowchart depicting a process for generating and transmitting an allocation signal, in accordance with various embodiments of the disclosure;

FIG. 7 is a flowchart depicting a process for transmitting data to a central controller, in accordance with various embodiments of the disclosure;

FIG. 8 is a flowchart depicting a process for dynamically modifying energy budgets of processing units, in accordance with various embodiments of the disclosure;

FIG. 10 is a flowchart depicting a process for generating and transmitting an allocation signal by a central controller, in accordance with various embodiments of the disclosure;

FIG. 11 is a flowchart depicting a process for executing services by multiple network devices, in accordance with various embodiments of the disclosure.

Figure 1:
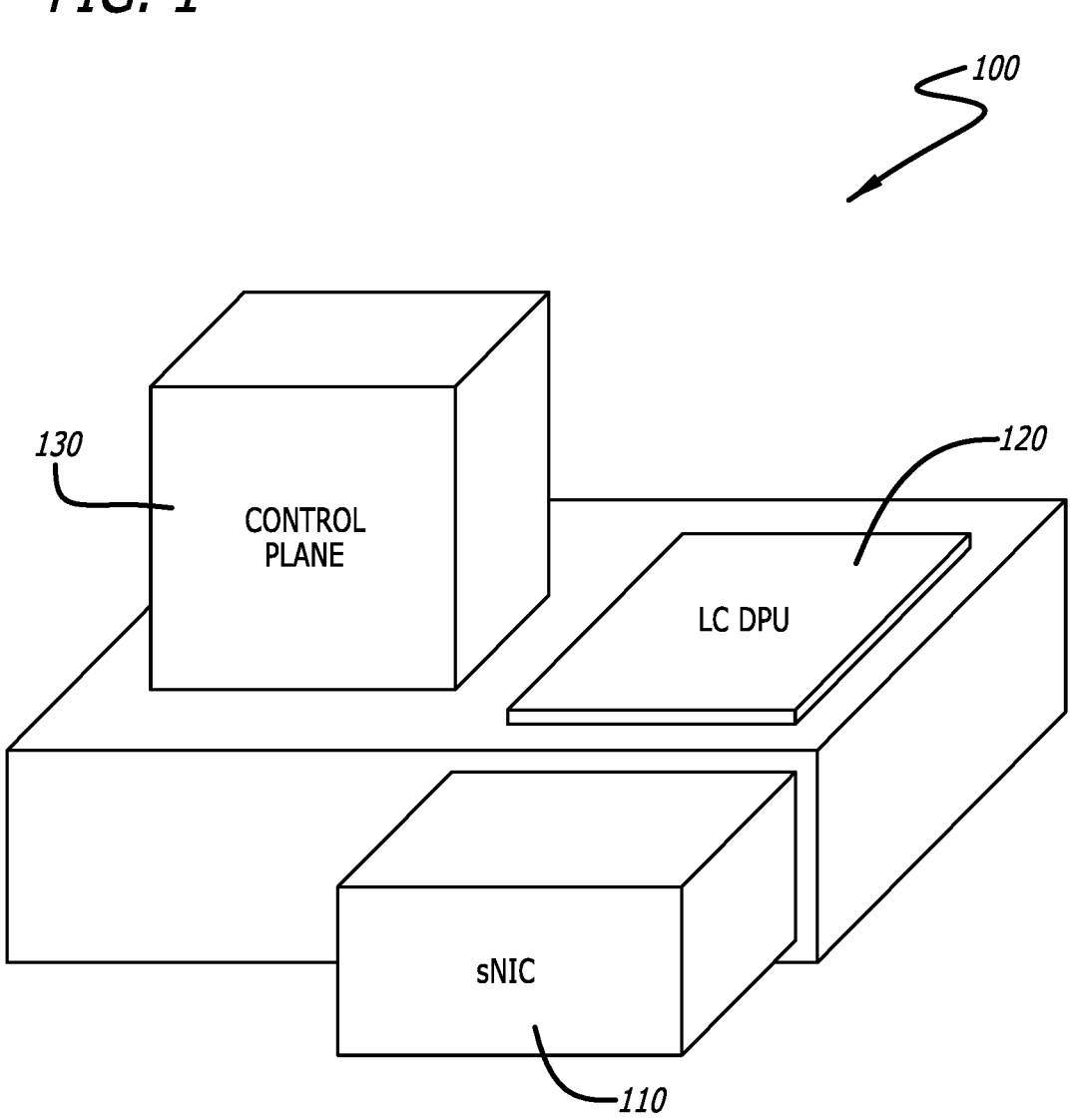
FIG. 1 is a conceptual illustration of a Smart Network Interface Card (sNIC), a Line Card (LC) Data Processing Unit (DPU), and a control plane in a device, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that offload services on one or more processing units or network devices. In many embodiments, a device can determine a plurality of energy profiles corresponding to a plurality of processing units. In some embodiments, the processing units may be located within the device. In certain embodiments, the processing units may be located in a network device that is in communication with the device. The examples of the processing units include, but are not limited to, Data Processing Units (DPUs), Network Processing Units (NPUs), accelerators, Smart Network Interface Cards (sNICs), processors, controllers, Graphics Processing Units (GPUs), or any such other components that are capable of processing data. In numerous embodiments, in a non-limiting example, the device may be an sNIC or a cluster of sNICs. For determining the energy profiles, the device may receive a plurality of power consumption metrics from the processing units in real-time or in near real-time. The examples of the power consumption metrics include, but are not limited to, power consumed by the processing unit for executing one service request. In more embodiments, executing the service request may include executing one or more instructions corresponding to the service request by the processing unit. The device can generate the energy profiles corresponding to the processing units based on the power consumption metrics received by the processing units. In some more embodiments, for example, the energy profiles may be indicative of a number of service requests that can be executed by the processing units by utilizing a predetermined amount of power. The energy profiles can also be indicative of power efficiencies of the processing units. In numerous embodiments, for example, if a processing unit is not capable of collecting or transmitting the power consumption metrics (for instance, legacy devices) the device may generate the energy profile for the processing unit based on a datasheet or any such technical documentation corresponding to the processing unit. That is, the device of the present disclosure can determine energy profiles for both new and legacy processing units.

In a number of embodiments, the device may receive one or more service requests. The service requests can be received through a data flow or a data stream. The data flow or the data stream may include a plurality of data packets. Each data packet may correspond to or may include the one or more service requests. The device may assign one or more processing units to each service request based on the energy profiles of the processing units. In some embodiments, for example, the device may assign a first service request to a first processing unit and a second service request to a second processing unit. In numerous embodiments, for example, when the first service request includes multiple instances of a first service, the device may assign one or more instances of the first service to the first processing unit and remaining instances of the first service to the second processing unit. The device can further determine one or more state entries for, or associated with, the processing units. The state entries may be indicative of which processing units should execute the one or more service requests, or which processing units should skip the one or more service requests, or which processing units must forward the one or more service requests without execution. The device may generate an allocation signal based on the state entries. In many further embodiments, the allocation signal may be indicative of the state entries for one or more processing units. The device can transmit the allocation signal to the processing units. In numerous embodiments, for example, the transmission of the allocation signal to the processing units can be performed in a data plane. The processing units may receive the allocation signal and may execute or forward or skip the one or more service requests based on the state entries indicated by the allocation signal. In additional embodiments, for example, the device can generate and transmit a separate allocation signal for each processing unit.

In various embodiments, a network device may determine the energy profiles of the processing units within the network device. The network device can transmit the energy profiles of the processing units to the device or to a central controller. In some embodiments, the central controller may be in communication with multiple network devices by way of wired or wireless communication. In certain embodiments, the central controller can be provided in form of Software as a Service (SaaS) and can executed on an external device. The central controller may receive multiple energy profiles of multiple processing units from multiple network devices. The central controller can assign the one or more service requests to the one or more processing units based on the received energy profiles. The central controller may determine the state entries for the processing units within the network devices to which the one or more service requests are assigned. The central controller can generate the allocation signal indicative of the state entries for the processing units within the network devices. The central controller may transmit the allocation signal to the network devices. In more embodiments, the central controller may generate and transmit a separate allocation signal for each network device. The network devices can receive the allocation signal, and the processing units in the network devices can execute or skip the one or more service requests based on the state entries indicated by the allocation signal.

In additional embodiments, the device may determine a target sustainability metric. The target sustainability metric may be indicative of a maximum allowable power consumption for the device. The device may further determine an energy budget for each processing unit within the device based on the target sustainability metric. The energy budget may be indicative of a maximum allowable power consumption for corresponding processing unit. The device can monitor the power consumption of the processing units in real-time or in near real-time. The device can further modify the energy budgets for the processing units based on corresponding real-time power consumption. The device may further modify the state entries corresponding to the processing units based on the modified energy budgets for the processing units. In some embodiments, the central controller may determine energy budgets for the network devices based on the target sustainability metric. The central controller may assign the one or more service requests to the network devices based on the corresponding energy budgets of the network devices. The central controller can further monitor the power consumption of the network devices in real-time or in near real-time. The central controller may modify the energy budgets and consequently, the assignment of the service requests, based on the power consumption of the network devices in real-time or near real-time.

In additional embodiments, the device or the sNIC may execute one or more service requests and may forward or offload the remaining service requests to the one or more processing units. To indicate which service requests are skipped and which service requests are forwarded or assigned, the sNIC may modify a header of a data packet indicative of the service requests. The sNIC can generate a modified data packet including a modified header. The modified data packet may be indicative of execution of the one or more service requests by the sNIC. The sNIC may then generate a modified allocation signal and transmit the modified allocation signal to the processing units. Based on the modified allocation signal, the processing units may identify which service requests are not executed and may execute only those service requests, while skipping the service requests that are executed by the sNIC. Hence, the sNIC can ensure that each service request is only checked and executed once.

Advantageously, the process for offloading the service requests, as described in the various embodiments of the present disclosure, may dynamically determine and utilize the energy profiles of the processing units. The process can further selectively execute some service requests and selectively offload some service requests to different processing units based on the energy profiles. The process can strike a balance between efficiency of executing the service requests and power consumed in executing the service requests. The process can determine and modify the energy profiles of the processing units in real-time, thereby providing faster response times in changing network conditions. The selective offloading of the service requests can significantly improve the energy efficiency and resource utilization of the device.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C"

mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a Smart Network Interface Cards (sNIC) 110, a Line Card (LC) Data Processing Unit (DPU) 120, and a control plane 130 in a device 100, in accordance with various embodiments of the disclosure is shown. In many embodiments, the device 100 may receive and execute many service requests. The service requests can correspond to one or more services. Non-limiting examples of the services include Network Address Translation (NAT), Internet Protocol Security (IPSec), Best Match 25 (BM25), Network-Based Intrusion Detection System (NIDS), or Distributed Denial-Of-Service (DDOS), etc. The device 100 may include one or more processing units, each of which can receive the service requests and execute the services based on the service requests. Non-limiting examples of the processing units include Linux kernel or user space, Data Plane Development Kit (DPDK), or sNICs, etc. In numerous embodiments, different services may execute in different ways on different processing units. In some embodiments, for example, executing a service on the sNIC 110 can be faster but can consume more power. In certain embodiments for example, executing a service on Linux kernel may be slower and may result into delays, but may consume less power. In some embodiments, for example, IPSec may have more Requests per Joule (RPJ) when executed on the sNIC 110 than on DPDK. In certain embodiments, for example, top ranker may have more RPJ when executed on DPDK than on sNIC 110. In that case, the most power efficient way would be to execute IPSec service on the sNIC 110 and execute top ranker service on the DPDK. In various embodiments, this can be achieved by selectively executing service requests corresponding to the IPSec service on the sNIC 110 and selectively forwarding or offloading the service requests corresponding to the top ranker service to the DPDK. In numerous embodiments, a decision of offloading the services on different processing units in the device 100 may be based on energy efficiencies of executing those services on the processing units.

In a number of embodiments, for example, services like Bayes, API GW, Top Ranker, or SQL can have poor energy efficiency when executed on the sNIC 110. Hence, offloading these services to DPDK may be more energy efficient than executing these services on the sNIC 110. The device 100 may allocate one or more service requests corresponding to Bayes, API GW, Top Ranker, or SQL to DPDK and not to sNIC 110. Similarly, the device 100 may further allocate one or more service requests corresponding to IPSec to sNIC 110 and not to DPDK. In some embodiments, the sNIC 110 may selectively execute the service requests corresponding to IPSec and may offload the service requests corresponding to Bayes, API GW, Top Ranker, or SQL to the DPDK for execution. Thus, the device 100 may determine the most optimum processing unit for execution of the service requests such that the execution of the service requests is performed with minimal power consumption. In certain embodiments, the decision of executing or selectively offloading the services may be performed by the sNIC 110, for example, the sNIC 110 may selectively execute and offload different types of services.

In various embodiments, the device 100 may leverage the differences and non-linearities in the execution of the services (on the sNIC 110, LC DPU 120, and the control plane 130 to provide significant performance and/or energy gains by selectively executing certain services on the sNIC 110 and selectively offloading certain services to the LC DPU 120. In some embodiments, the sNIC 110 may be a single sNIC or may include a cluster of sNICs. In certain embodiments, the control plane 130 may include a forwarding engine. The forwarding engine may forward the service requests or may include one or more processing units to execute the service requests. In more embodiments, the sNIC 110, the LC DPU 120, or the control plane 130 can function as accelerators for executing the services corresponding to the service requests received by the device 100.

In many embodiments, the device 100 can consider unique characteristics of various services and various types of services, such as, but not limited to, DP component, IPsec, or NAT etc. for offloading the services. The device 100 may utilize data plane signaling or may also utilize metadata instructions, for example headers of data packets, for signaling the offloading of the services to the LC DPU 120 or the control plane 130. In some embodiments, the device 100 may utilize power consumptions of the sNIC 110, the LC DPU 120, or the control plane 130 on per feature offload basis to perform service acceleration among the sNIC 110, the LC DPU 120, or the control plane 130. In certain embodiments, each accelerator, i.e., the sNIC 110, the LC DPU 120, or the control plane 130 may be instructed by way of a local state, i.e., a state entry in an allocation signal or the header of the data packet, to either execute the service request or to forward the service request to next accelerator. In more embodiments, one accelerator may forward the service requests to another accelerator by utilizing the data plane signaling. In some more embodiments, the allocation signal can also be transmitted and/or received by way of the data plane signaling.

Although a specific embodiment for the processing units (i.e., the sNIC 110, the LC DPU 120, or the control plane 130) in the device 100 for carrying out the various steps, processes, methods, and operations described herein is discussed with respect to FIG. 1, any of a variety of systems and/or processes may be utilized in accordance with embodiments of the disclosure. For example, the device 100 may include multiple processing units in addition to or other than the processing units shown in FIG. 1 for accelerating the service requests. The elements depicted in FIG. 1 may also be interchangeable with other elements of FIGS. 2-12 as required to realize a particularly desired embodiment.

Figure 2:
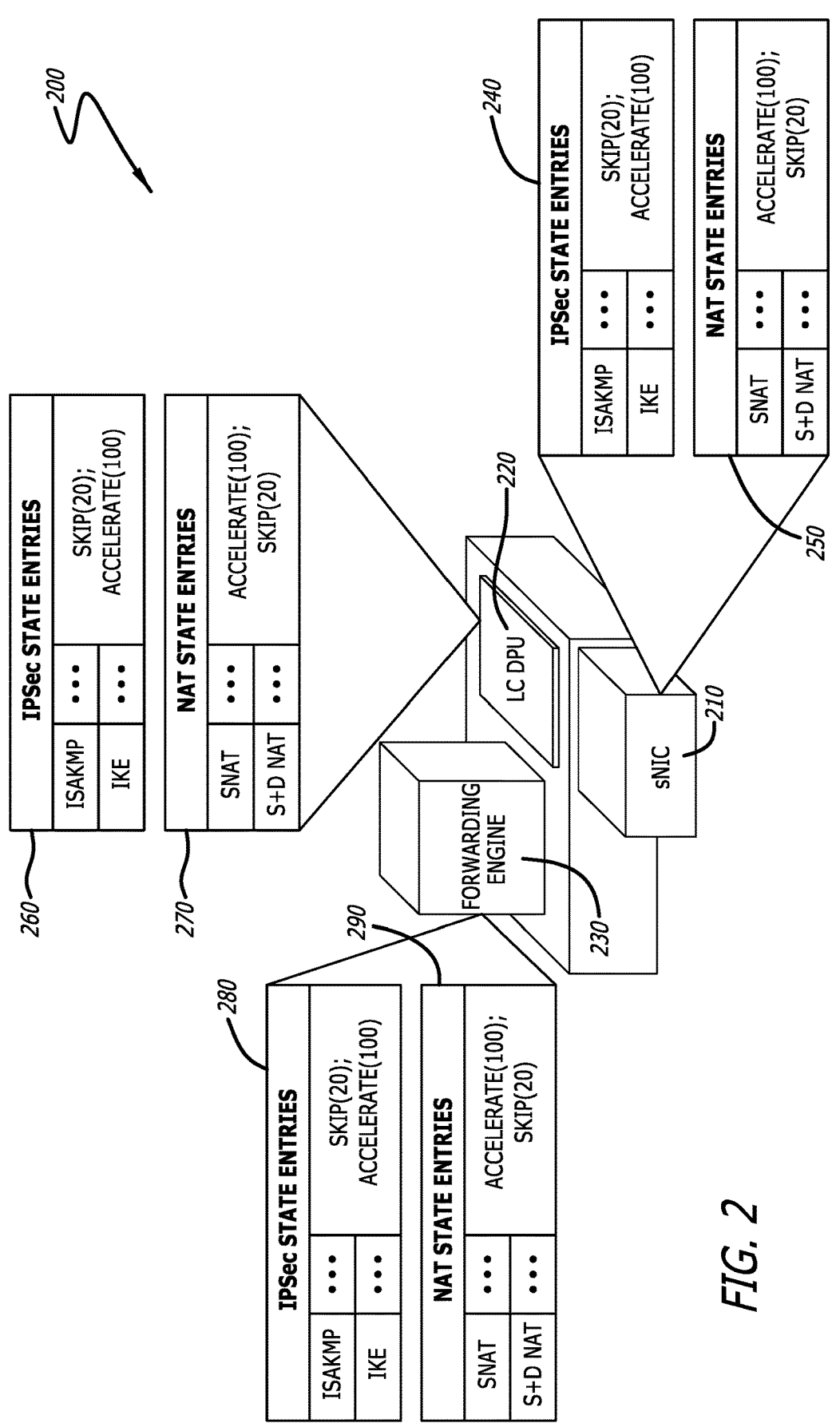
FIG. 2 is a conceptual illustration of one or more state entries for a Smart Network Interface Card (sNIC), a Line Card (LC) Data Processing Unit (DPU), and a forwarding engine in a device, in accordance with various embodiments of the disclosure.

Referring to FIG. 2, a conceptual illustration of one or more state entries for an sNIC 210, a LC DPU 220, and a forwarding engine 230 in a device 200, in accordance with various embodiments of the disclosure is shown. In many embodiments, the device 200 can receive one or more service requests corresponding to one or more services, such as, but not limited to, IPSec or NAT as shown in FIG. 2. The device 200 can further allocate the service requests to the sNIC 210, the LC DPU 220, and the forwarding engine 230. In that, the device 200 may generate an allocation signal indicative of one or more state entries for the sNIC 210, the LC DPU 220, and the forwarding engine 230. In some embodiments, the device 200 can generate a separate allocation signal for each of the sNIC 210, the LC DPU 220, and the forwarding engine 230. In more embodiments, the allocation signal may be transmitted through the data plane.

In a number of embodiments, for instance, the device 200 may generate IPSec state entries 240 and NAT state entries 250 for the sNIC 210. In many examples, the IPSec state entries 240 may indicate that the sNIC 210 should skip (or forward/offload) 100 IPsec service requests (or flows) and execute (or accelerate) 10 IPSec service requests (or flows). In additional examples, the NAT state entries 250 can indicate that the sNIC 210 should skip (or forward/offload) 20 NAT service requests (or flows) and execute (or accelerate) 100 NAT service requests (or flows). Similarly, the device 200 can further generate IPSec state entries 260 and NAT state entries 270 for the LC DPU 220. In many examples, the IPSec state entries 260 can indicate that the LC DPU 220 should skip (or forward/offload) 20 IPsec service requests (or flows) and execute (or accelerate) 100 IPSec service requests (or flows). In additional examples, the NAT state entries 270 may indicate that the LC DPU 220 should skip (or forward/offload) 20 NAT service requests (or flows) and execute (or accelerate) 100 NAT service requests (or flows). Similarly, the device 200 may also generate IPSec state entries 280 and NAT state entries 290 for the forwarding engine 230. In many examples, the IPSec state entries 280 may indicate that the forwarding engine 230 should execute (or accelerate) 50 IPSec service requests (or flows). In additional examples, the NAT state entries 290 can indicate that the forwarding engine 230 should execute (or accelerate) 100 NAT service requests (or flows). Here, the forwarding engine 230 may be assigned as a default accelerator for IPSec and NAT service requests. As a result, the forwarding engine 230 may not have an option of forwarding or offloading the IPSec or NAT service requests. In some more embodiments, for example, the LC DPU 220 can be assigned as the default accelerator. However, in that case, the LC DPU 220 may still have the option of forwarding or offloading the service requests to the forwarding engine 230.

In various embodiments, a count of state entries as shown in FIG. 2 may be dynamically updated by the device 200 in run-time. However, if an application requires static state entries, the device 200 can be capable of assigning static values for the state entries. The device 200 may also implement a closed loop optimization for the state entries. The closed loop optimization may be performed by the device 200 or by a central controller in a network by monitoring the power consumption of the sNIC 210, the LC DPU 220, and the forwarding engine 230 in real-time or in near real-time. The device 200 or the central controller may offload the services based on the power consumption of the sNIC 210, the LC DPU 220, and the forwarding engine 230 at run-time.

Although a specific embodiment for the processing units (i.e., the sNIC 210, the LC DPU 220, or the forwarding engine 230) in the device 200 for carrying out the various steps, processes, methods, and operations described herein is discussed with respect to FIG. 2, any of a variety of systems and/or processes may be utilized in accordance with embodiments of the disclosure. For example, the device 200 may generate and modify the state entries for the sNIC 210, the LC DPU 220, or the forwarding engine 230 in response to dynamic changes in the network, or in response to real-time variations in data traffic or energy consumption in the network. The elements depicted in FIG. 2 may also be interchangeable with other elements of FIG. 1 and FIGS. 3-12 as required to realize a particularly desired embodiment.

Figure 3:
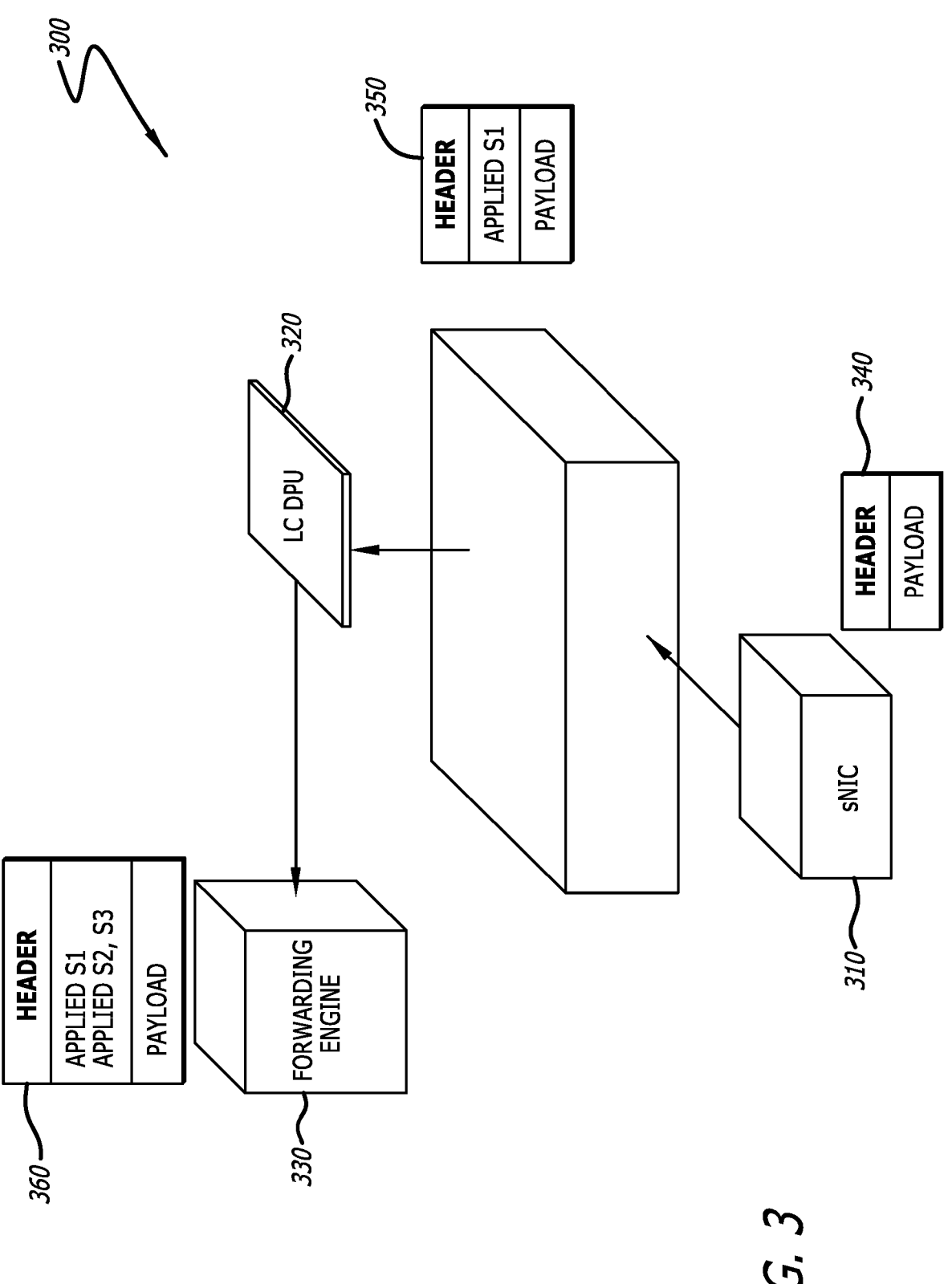
FIG. 3 is a conceptual illustration of selective offloading and execution of services in a device, in accordance with various embodiments of the disclosure.

Referring to FIG. 3, a conceptual illustration of selective offloading and execution of services in a device 300, in accordance with various embodiments of the disclosure is shown. In many embodiments, the device 300 may include an sNIC 310, an LC DPU 320, and a forwarding engine 330. The device 300 may balance the service acceleration by utilizing a skip and accelerate semantic. In some embodiments, for example, the device 300 can generate the state entries for the sNIC 310, the LC DPU 320, and the forwarding engine 330, wherein the state entries are indicative of skip and accelerate entries. The sNIC 310, the LC DPU 320, and the forwarding engine 330 can accelerate or skip the service requests based on the state entries.

In a number of embodiments, an inbound flow or service requests received by the LC DPU 320 from the sNIC 310, or the inbound flow received by the forwarding engine 330 from the LC DPU 320 must have a way to signal whether a specific service is executed or not. In an example shown in FIG. 3, the device 300 must execute the services S1, S2, S3, and S4 indicated by a data packet 340. In some embodiments, for example, the sNIC 310 can execute the service S1 based on a local instruction or a state entry. In that case, the sNIC 310 may modify the header of the data packet 340 indicative of the service requests S1-S4 to indicate that the service S1 is executed by the sNIC 310. The sNIC 310 may forward the modified data packet 350 to the LC DPU 320 by way of the data plane. In certain embodiments, the sNIC 310 may generate and transmit a modified allocation signal to the LC DPU 320 by way of the data plane such that the modified allocation signal is indicative of the modified data packet 350 including the modified header. In more examples, the LC DPU 320 may receive the modified data packet 350 and may execute the services S2 and S3. The LC DPU may further modify the modified data packet 350 and transmit the further modified data packet 360 to the forwarding engine 330. In some more embodiments, the LC DPU 320 can also modify the allocation signal and transmit the further modified allocation signal to the forwarding engine 330. In numerous embodiments, the forwarding engine 330 may receive the further modified data packet 360 and may execute the service S4. Thus, the device 300 can distribute the execution of the services S1-S4 among the sNIC 310, the LC DPU 320, and the forwarding engine 330. The device 300 may further facilitate data plane signaling among the sNIC 310, the LC DPU 320, and the forwarding engine 330 to indicate the execution of the services S1-S4. In many further embodiments, the sNIC 310 may accelerate all the services S1-S4. In still more embodiments, the sNIC 310 may forward out the service requests without forwarding internally to the LC DPU 320 or the forwarding engine 330.

Although a specific embodiment for selective offloading and execution of services in the device 300 for carrying out the various steps, processes, methods, and operations described herein is discussed with respect to FIG. 3, any of a variety of systems and/or processes may be utilized in accordance with embodiments of the disclosure. For example, the device 300 may distribute the acceleration of the services S1-S4 among the sNIC 310, the LC DPU 320, and the forwarding engine 330. The elements depicted in FIG. 3 may also be interchangeable with other elements of FIGS. 1-2 and FIGS. 4-12 as required to realize a particularly desired embodiment.

Figure 4:
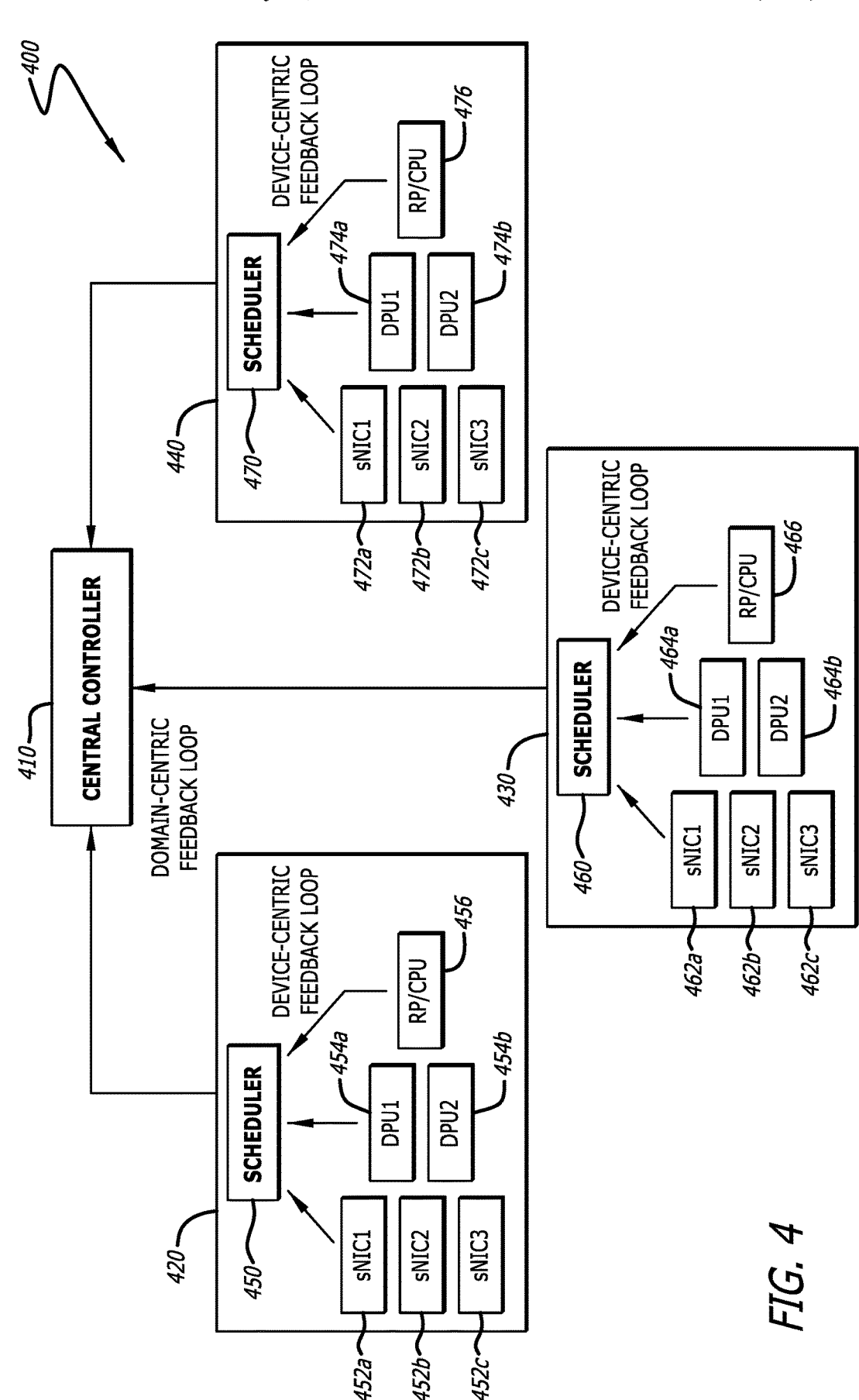
FIG. 4 is a conceptual illustration of service acceleration among multiple network devices, in accordance with various embodiments of the disclosure.

Referring to FIG. 4, a conceptual illustration of service acceleration among multiple network devices, in accordance with various embodiments of the disclosure is shown. In many embodiments, a network 400 may include a central controller 410 connected to a first network device 420, a second network device 430, and a third network device 440. The first network device 420 may include a first scheduler 450, a first cluster of sNICs 452, a first cluster of DPUs 454, and a first Route Processor (RP) Central Processing Unit (CPU) 456. The second network device 430 may include a second scheduler 460, a second cluster of sNICs 462, a second cluster of DPUs 464, and a second RP CPU 466. The third network device 440 may include a third scheduler 470, a third cluster of sNICs 472, a third cluster of DPUs 474, and a third RP CPU 476.

In a number of embodiments, in an individual approach, a device path within the first through third network devices 420-440 can start from the cluster of sNICs, then the DPUs, and then the RP CPUs. In some embodiments, in every network device, the cluster of sNICs may execute one or more services based on an energy budget assigned to the cluster of sNICs. The sNICs may further forward the service requests for the remaining services to the DPUs along with the data plane signaling. The DPUs can thereafter execute one or more of the remaining services and can forward the rest of the services to the RP CPUs along with additional data plane signaling. In such an individual approach, the schedulers in the network devices are enabled only when the network devices receive the incoming data flow.

In various embodiments, in a centralized approach, the central controller 410 can collect power consumption metrics from each of the first through third network devices 420-440. In some embodiments, the power consumption metrics may correspond to the first through third network devices 420-440. In certain embodiments, the power consumption metrics can correspond to the processing units (i.e., the cluster of sNICs, the DPUs, or the RP CPUs, etc.) in the first through third network devices 420-440. The central controller 410 may utilize the power consumption metrics to determine the energy budgets for the first through third network devices 420-440. The central controller 410 may communicate the respective energy budgets to the first through third network devices 420-440. The first through third schedulers 450, 460, and 470 in the first through third network devices 420-440 may utilize the energy budgets to dynamically offload or distribute the services among the processing units (i.e., the cluster of sNICs, the DPUs, or the RP CPUs, etc.) in the first through third network devices 420-440. In more embodiments, the allocation of the services to the processing units in the first through third network devices 420-440 may be performed by the respective first through third schedulers 450, 460, and 470 or by the central controller 410.

In additional embodiments, the central controller 410 may receive real-time feedback from the first through third schedulers 450, 460, and 470 about real-time consumption of the processing units. In some embodiments, the central controller 410 may utilize the real-time feedback to modify the energy budgets allocated to the first through third network devices 420-440. In certain embodiments, the central controller 410 or the first through third schedulers 450, 460, and 470 can configure the processing units in the first through third network devices 420-440 based on the respective energy budgets at run-time. In more embodiments, the central controller 410 may utilize the allocation technique to distribute the execution of the services across a plurality of network devices in the network 400, including the first through third network devices 420-440. In some more embodiments, the network 400 can utilize two levels of optimization, viz, choosing an optimum scheduler based on the energy budgets and then choosing an optimum processing unit in communication with the optimum scheduler. Thus, in numerous embodiments, the network 400 may utilize two feedback loops to facilitate two levels of optimization.

Although a specific embodiment for service acceleration among multiple network devices for carrying out the various steps, processes, methods, and operations described herein is discussed with respect to FIG. 4, any of a variety of systems and/or processes may be utilized in accordance with embodiments of the disclosure. For example, the network 400 may implement multiple levels of feedback loops and optimizations between the central controller and the network devices and the processing units therein. The elements depicted in FIG. 4 may also be interchangeable with other elements of FIGS. 1-3 and FIGS. 5-12 as required to realize a particularly desired embodiment.

Figure 5:
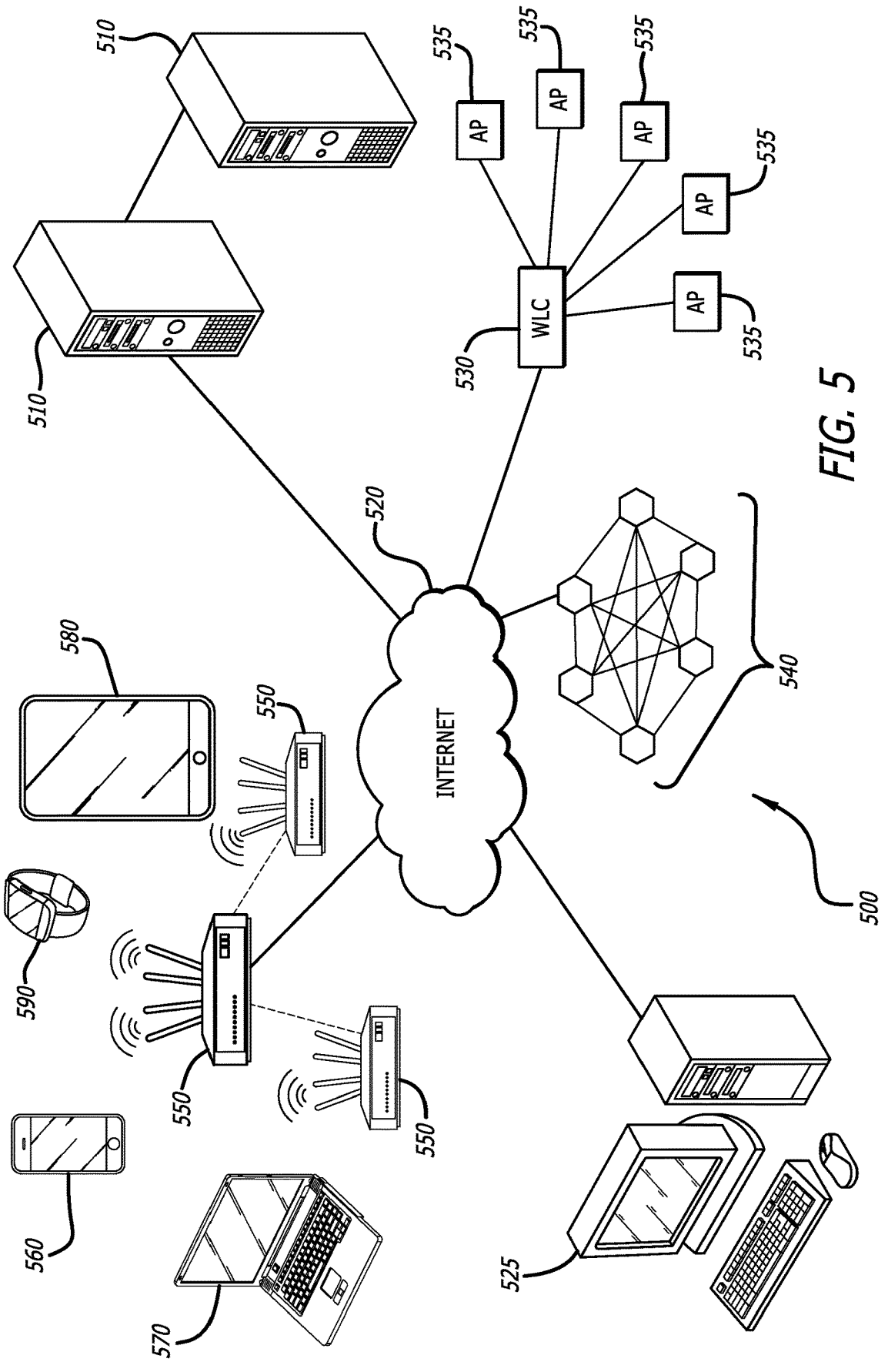
FIG. 5 is a conceptual network diagram of various environments that a service accelerator may operate on a plurality of network devices, in accordance with various embodiments of the disclosure.

Referring to FIG. 5, a conceptual network diagram 500 of various environments that a service accelerator may operate on a plurality of network devices, in accordance with various embodiments of the disclosure is shown. Those skilled in the art will recognize that the service accelerator can be comprised of various hardware and/or software deployments and can be configured in a variety of ways. In many embodiments, the service accelerator can be configured as a stand-alone device, exist as a logic in another network device, be distributed among various network devices operating in tandem, or remotely operated as part of a cloud-based network management tool. In further embodiments, one or more servers 510 can be configured with or otherwise operate the service accelerator. In many embodiments, the service accelerator may operate on one or more servers 510 connected to a communication network 520. The communication network 520 can include wired networks or wireless networks. In many embodiments, the communication network 520 may be a Wi-Fi network operating on various frequency bands, such as, 2.4 GHz, 5 GHZ, or 6 GHZ. In further embodiments, the service accelerator operating on the servers 510 can offload the execution of services to different devices. The service accelerator can be provided as a cloud-based service that can service remote networks, such as, but not limited to a deployed network 540. In many embodiments, the service accelerator can be a logic that allocates execution or acceleration of the services among different devices.

However, in additional embodiments, the service accelerator may be operated as a distributed logic across multiple network devices. In the embodiment depicted in FIG. 5, a plurality of network access points (APs) 550 can operate as the service accelerator in a distributed manner or may have one specific device operate as the service accelerator for all of the neighboring or sibling APs 550. The APs 550 facilitate Wi-Fi connections for various electronic devices, such as but not limited to mobile computing devices including laptop computers 570, cellular phones 560, portable tablet computers 580 and wearable computing devices 590.

In further embodiments, the service accelerator may be integrated within another network device. In the embodiment depicted in FIG. 5, a wireless LAN controller (WLC) 530 may have an integrated service accelerator that the WLC 530 can use to accelerate the services within the various APs 535 that the WLC 530 is connected to, either wired or wirelessly. In still more embodiments, a personal computer 525 may be utilized to access and/or manage various aspects of the service accelerator, either remotely or within the network itself. In the embodiment depicted in FIG. 5, the personal computer 525 communicates over the communication network 520 and can access the service accelerator of the servers 510, or the network APs 550, or the WLC 530.

Although a specific embodiment for various environments that the service accelerator may operate on a plurality of network devices suitable for carrying out the various steps, processes, methods, and operations described herein is discussed with respect to FIG. 5, any of a variety of systems and/or processes may be utilized in accordance with embodiments of the disclosure. In many non-limiting examples, the service accelerator may be provided as a device or software separate from the network devices or the service accelerator may be integrated into the network devices. The elements depicted in FIG. 5 may also be interchangeable with other elements of FIGS. 1-4 and 6-12 as required to realize a particularly desired embodiment.

Referring to FIG. 6, a flowchart depicting a process 600 for generating and transmitting the allocation signal, in accordance with various embodiments of the disclosure is shown. In many embodiments, the process 600 may determine the energy profiles corresponding to the processing units (block 610). In some embodiments, the process 600 can be implemented by the device comprising the processing units therein. In certain embodiments, the process 600 may be implemented by the central controller in communication with multiple devices comprising the processing units therein. In more embodiments, the process 600 can determine the energy profiles based on the real-time or near real-time power consumption of the processing units. In some more embodiments, the process 600 may determine the energy profiles based on the power consumption metrics received from the processing units or from the devices or from the schedulers within the devices. In numerous embodiments, the examples of the power consumption metrics include, but are not limited to, power consumed by the processing unit for executing one service request. In many further embodiments, for example, the energy profiles may be indicative of the number of service requests that can be executed by the processing units by utilizing same or a predetermined amount of power. In still more embodiments, for example, the energy profiles can also be indicative of power efficiencies of the processing units. In many additional embodiments, for example, if a processing unit is not capable of collecting or transmitting the power consumption metrics (for instance, legacy devices) the process 600 may generate the energy profile for the processing unit based on a datasheet or any such technical documentation corresponding to the processing unit. That is, in still further embodiments, the process 600 can determine the energy profiles for both: new and legacy processing units. In many more embodiments, non-limiting examples of the processing units can include Linux kernel or user space, DPDK, LC DPUs, RP CPUs, or sNICs, etc.

In a number of embodiments, the process 600 can receive one or more service requests (block 620). In some embodiments, the service requests may correspond to one or more services, or cloud native services, microservices, or functions. In certain embodiments, non-limiting examples of the services may include NAT, IPSec, BM25, NIDS, or DDOS, etc. In more embodiments, the service requests can be received through a data flow or a data stream. In some more embodiments, the data flow or the data stream may include a plurality of data packets. In numerous embodiments, each data packet may correspond to or may include the one or more service requests.

In various embodiments, the process 600 can assign one or more processing units to the one or more service requests based on their energy profiles (block 630). In some embodiments, for example, the process 600 may assign a first service request to a first processing unit and a second service request to a second processing unit. In certain embodiments, for example, when the first service request includes multiple instances of the first service, the process 600 may assign one or more instances of the first service to the first processing unit and remaining instances of the first service to the second processing unit.

In additional embodiments, the process 600 may determine one or more state entries for the one or more processing units (block 640). In some embodiments, the process 600 can determine the skip and accelerate semantic for the processing units. In certain embodiments, the state entries may be indicative of which processing units should execute the one or more service requests, or which processing units should skip the one or more service requests, or which processing units must forward the one or more service requests without execution.

In further embodiments, the process 600 can generate the allocation signal indicative of the one or more state entries (block 650). In some embodiments, the allocation signal may be indicative of the state entries for one or more processing units. In certain embodiments, for example, the process 600 can generate a separate allocation signal for each processing unit. In more embodiments, the allocation signal may comprise the data packet with the header indicative of the state entries. In some more embodiments, the data packet can be modified by the processing units to indicate the execution of the one or more service requests. In numerous embodiments, the modified data packet or the allocation signal may be forwarded between the processing units by way of the data plane signaling.

In many more embodiments, the process 600 may transmit the allocation signal to the one or more processing units (block 660). In some embodiments, for example, the transmission of the allocation signal to the processing units can be performed in the data plane. In certain embodiments, the processing units may receive the allocation signal and may execute or forward or skip the one or more service requests based on the state entries indicated by the allocation signal.

Although a specific embodiment for the process 600 for generating and transmitting the allocation signal for carrying out the various steps, processes, methods, and operations described herein is discussed with respect to FIG. 6, any of a variety of systems and/or processes may be utilized in accordance with embodiments of the disclosure. For example, the allocation signal may indicate that the processing units should selectively skip or execute the service requests. The elements depicted in FIG. 6 may also be interchangeable with other elements of FIGS. 1-5 and FIGS. 7-12 as required to realize a particularly desired embodiment.

Referring to FIG. 7, a flowchart depicting a process 700 for transmitting data to a central controller, in accordance with various embodiments of the disclosure is shown. In many embodiments, the process 700 can receive power consumption metrics from the processing units in real-time or in near real-time (block 710). In some embodiments, the examples of the power consumption metrics include, but are not limited to, the power consumed by the processing unit for executing one service request. In certain embodiments, the scheduler within the devices or the network devices may collect the power consumption metrics from the processing units therein. In more embodiments, the process 700 can be implemented by the scheduler in the devices or the network devices.

In a number of embodiments, the process 700 may generate the energy profiles corresponding to the processing units based on their power consumption metrics (block 720). In some embodiments, the process 700 may modify the energy profiles at run-time based on the real-time changes in the power consumption metrics of the processing units. In certain embodiments, the process 700 can also modify the energy profiles of the processing units based on the dynamic changes in the network.

In various embodiments, the process 700 can transmit the energy profiles corresponding to the processing units to the central controller (block 730). In some embodiments, the central controller may be in communication with a plurality of devices or the network devices. In certain embodiments, the central controller can be within the network or can be external to the network. In more embodiments, the central controller may facilitate two levels of optimization, viz., an optimum device or network device for offloading the services (level 1) and an optimum processing unit within the optimum device or network device (level 2).

In additional embodiments, the process 700 may receive one or more state entries for one or more processing units from the central controller (block 740). In some embodiments, the central controller may determine the target sustainability metric and allocate the energy budgets to the devices or the network devices. In certain embodiments, the central controller can generate and transmit the allocation signal to the scheduler in the device or the network device based on the energy budgets of the devices or network devices and the target sustainability metric. In more embodiments, the process 700 when implemented by the scheduler may configure the processing units to perform the skip and accelerate functions indicated by the allocation signal. In some more embodiments, the central controller may simply direct the flow to the device or the network device. In that case, in numerous embodiments, the process 700 when implemented by the scheduler in the device or the network device may generate the state entries and transmit the allocation signal to the processing units. Thus, in many more embodiments, the process 700 may facilitate flexibility in generation of the allocation signal for offloading the services by the central controller or by the scheduler.

Although a specific embodiment for the process 700 for transmitting data to the central controller for carrying out the various steps, processes, methods, and operations described herein is discussed with respect to FIG. 7, any of a variety of systems and/or processes may be utilized in accordance with embodiments of the disclosure. For example, the process 700 may facilitate offloading of the services by the central controller and/or the scheduler in the devices or the network devices. The elements depicted in FIG. 7 may also be interchangeable with other elements of FIGS. 1-6 and FIGS. 8-12 as required to realize a particularly desired embodiment.

Referring to FIG. 8, a flowchart depicting a process 800 for dynamically modifying energy budgets of processing units, in accordance with various embodiments of the disclosure is shown. In many embodiments, the process 800 can determine the target sustainability metric (block 810). In some embodiment, the target sustainability metric may be indicative of the maximum allowable power consumption for the device. In certain embodiments, the target sustainability metric may be a static value. In more embodiments, the target sustainability metric can change dynamically with change in network conditions and/or change in power consumption of the processing units.

In a number of embodiments, the process 800 may determine the energy budget for each processing unit based on the target sustainability metric (block 820). In some embodiments, the energy budget may be indicative of the maximum allowable power consumption for corresponding processing unit. In certain embodiments, the central controller may determine the energy budgets for the device or the network device. In more embodiments, the process 800 can determine energy budgets on device level as well as on processing unit level.

In various embodiments, the process 800 can dynamically modify the state entries for the processing units based on corresponding energy budget (block 830). In some embodiments, the process 800 may dynamically modify the skip and accelerate semantic in the state entries. In certain embodiments, for example, the process 800 can assign more skip entries to the processing units that consume more power for executing the services and can assign more accelerate entries to the processing units that consume less power for executing the services. In more embodiments, the modified state entries may be transmitted to the processing units by way of the allocation signal or by the modified data packet headers or by the data plane signaling.

In additional embodiments, the process 800 may monitor the power consumption of the processing units in real-time or in near real-time (block 840). In some embodiments, the process 800, when implemented by the scheduler in the device or the network device, can receive the power consumption metrics from the processing units. In certain embodiments, the process 800, when implemented by the central controller, may receive the power consumption metrics of the processing units from the scheduler.

In further embodiments, the process 800 can dynamically modify the energy budget for the processing unit based on the power consumption of the processing unit (block 850). In some embodiments, the process 800 can modify the energy budgets for the processing units based on the target sustainability metric. In certain embodiments, the process 800 may modify the energy budgets for the processing units in response to dynamic changes in the network conditions or in response to variations in the power consumption of the network.

Although a specific embodiment for the process 800 for dynamically modifying energy budgets of processing units for carrying out the various steps, processes, methods, and operations described herein is discussed with respect to FIG. 8, any of a variety of systems and/or processes may be utilized in accordance with embodiments of the disclosure. For example, the process 800 may facilitate adaptation to dynamically changing network conditions. The elements depicted in FIG. 8 may also be interchangeable with other elements of FIGS. 1-7 and FIGS. 9-12 as required to realize a particularly desired embodiment.

Figure 9:
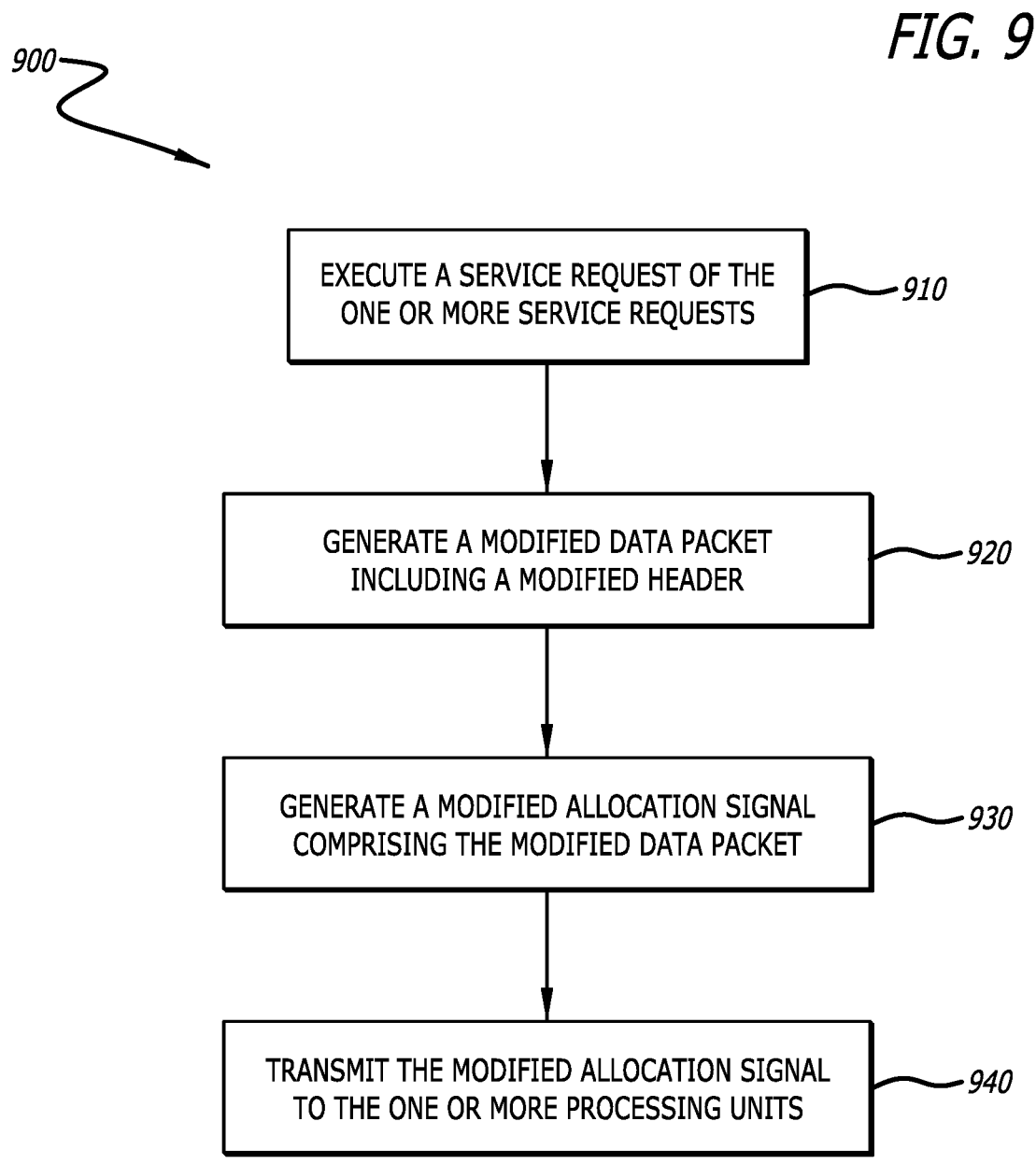
FIG. 9 is a flowchart depicting a process for modifying a data packet, in accordance with various embodiments of the disclosure.

Referring to FIG. 9, a flowchart depicting a process 900 for modifying the data packet, in accordance with various embodiments of the disclosure is shown. In many embodiments, the process 900 can execute the service request of the one or more service requests (block 910). In some embodiments, the process 900 can receive the data packet through the incoming data flow. In certain embodiments, for example, the data packet may be indicative of one or more service requests S1, S, S3, and S4. In more embodiments, the process 900 may be implemented by the sNIC, wherein the sNIC can execute one or more services corresponding to the one or more service requests. In some more embodiments, the sNIC may execute the one or more services based on the state entries corresponding to the sNIC. In numerous embodiments, the sNIC can selectively forward or offload the service requests that are not executed by the sNIC.

In a number of embodiments, the process 900 may generate the modified data packet including the modified header (block 920). In some embodiments, the sNIC can modify the header of the data packet to indicate that the one or more service requests are executed by the sNIC. In certain embodiments, for example, the sNIC can execute the service S1 based on the local instruction or the state entry. In more embodiments, for example, the sNIC may modify the header of the data packet to indicate that the service S1 is executed by the sNIC.

In various embodiments, the process 900 can generate the modified allocation signal comprising the modified data packet (block 930). In some embodiments, the modified allocation signal may be indicative of the modified data packet including the modified header. In certain embodiments, the modified data packet may include the state entries corresponding to the other processing units (for example, LC DPU or forwarding engine) for executing the services S2-S4.

In additional embodiments, the process 900 may transmit the modified allocation signal to the other processing units (block 940). In some embodiments, the sNIC may forward the modified data packet including the modified header to the other processing units through the data plane. In certain embodiments, the sNIC can generate and transmit the modified allocation signal to the other processing units by way of the data plane signaling. In more embodiments, the modified allocation signal can be indicative of the modified data packet including the modified header.

Although a specific embodiment for the process 900 for modifying the data packet for carrying out the various steps, processes, methods, and operations described herein is discussed with respect to FIG. 9, any of a variety of systems and/or processes may be utilized in accordance with embodiments of the disclosure. For example, the process 900 may facilitate distribution of service acceleration among different processing units. The elements depicted in FIG. 9 may also be interchangeable with other elements of FIGS. 1-8 and FIGS. 10-12 as required to realize a particularly desired embodiment.

Referring to FIG. 10, a flowchart depicting a process 1000 for generating and transmitting the allocation signal by the central controller, in accordance with various embodiments of the disclosure is shown. In many embodiments, the process 1000 can receive the power consumption metrics from a plurality of network devices (block 1010). In some embodiments, the process 1000 may be implemented by the central controller. In certain embodiments, the process 1000 can receive the power consumption metrics from the processing units in real-time or in near real-time. In more embodiments, the process 1000 may receive the power consumption metrics of the processing units from the corresponding scheduler of the corresponding network device. In some more embodiments, the examples of the power consumption metrics include, but are not limited to, power consumed by the processing unit for executing one service request.

In a number of embodiments, the process 1000 may determine the plurality of energy profiles corresponding to the plurality of network devices based on the power consumption metrics (block 1020). In some embodiments, the energy profiles may be indicative of a number of service requests that can be executed by the device or the network device by utilizing a predetermined amount of power. In certain embodiments, the process 1000 may generate the energy profiles on per feature basis, as the power consumption of the device or the network device may differ for executing different services, based on the unique characteristics or features of the services. In more embodiments, the process 1000 can modify the energy profiles in real-time or near-real time based on the corresponding power consumption metrics.

In various embodiments, the process 1000 may receive one or more service requests (block 1030). In some embodiments, the service requests may be received by the process 1000 through the incoming data flow. In certain embodiments, the incoming data flow may comprise the plurality of data packets or a stream of data packets. In more embodiments, each data packet may correspond to one or more service requests. In some more embodiments, the one or more service requests may correspond to one or more services, microservices, cloud native services, or functions, for example. In numerous embodiments, the examples of the services include, but are not limited to, NAT, IPSec, BM25, NIDS, DDOS, Bayes, API GW, Top Ranker, or SQL etc.

In additional embodiments, the process 1000 can assign one or more network devices from the plurality of network devices to the one or more service requests based on the plurality of energy profiles (block 1040). In some embodiments, different services may execute differently and non-linearly on different processing units in the network devices. In certain embodiments, the process 1000 may utilize the power consumption metrics to determine the energy budgets for the network devices. In more embodiments, the process 1000 can communicate the respective energy budgets to the network devices. In some more embodiments, the process 1000 may utilize the energy budgets to dynamically offload or distribute the service acceleration among different processing units in the network devices.

In further embodiments, the process 1000 may generate the allocation signal indicative of assignment of the one or more network devices (block 1050). In some embodiments, the allocation signal may be indicative of the network devices assigned for the one or more services. In certain embodiments, the allocation signal may include one or more state entries for one or more processing units in the network devices. In more embodiments, the state entries may be indicative of which processing units should execute the one or more service requests, or which processing units should skip the one or more service requests, or which processing units must forward the one or more service requests without execution.

In many more embodiments, the process 1000 can transmit the allocation signal to the one or more network devices (block 1060). In some embodiments, the process 1000 can transmit the allocation signal to the respective schedulers in the network devices. In certain embodiments, the allocation signal can be transmitted by way of the data plane signaling. In more embodiments, the process 1000 can utilize two levels of optimization, viz, choosing an optimum scheduler based on the energy budgets and then choosing an optimum processing unit in communication with the optimum scheduler. Thus, in numerous embodiments, the process 1000 may utilize two feedback loops to facilitate two levels of optimization.

Although a specific embodiment for the process 1000 for generating and transmitting the allocation signal by the central controller for carrying out the various steps, processes, methods, and operations described herein is discussed with respect to FIG. 10, any of a variety of systems and/or processes may be utilized in accordance with embodiments of the disclosure. For example, the central controller may facilitate distribution of service acceleration among the different network devices and the processing units therein. The elements depicted in FIG. 10 may also be interchangeable with other elements of FIGS. 1-9 and FIGS. 11-12 as required to realize a particularly desired embodiment.

Referring to FIG. 11, a flowchart depicting a process 1100 for executing services by multiple network devices, in accordance with various embodiments of the disclosure is shown. In many embodiments, the process 1100 can execute a first service request of the one or more service requests based on the allocation signal in a first network device of the one or more network devices (block 1110). In some embodiments, the first sNIC or the first cluster of sNICs in the first network device can receive the data packet indicative of the one or more service requests. In certain embodiments, the first sNIC or the first cluster of sNICs in the first network device can execute the first service corresponding to the first service request.

In a number of embodiments, the process 1100 can modify the allocation signal to generate the modified allocation signal indicative of execution of the first service request by the first network device (block 1120). In some embodiments, the first sNIC or the first cluster of sNICs in the first network device can modify the header of the data packet to generate the modified data packet. In certain embodiments, the modified allocation signal may be indicative of the modified data packet comprising the modified header.

In various embodiments, the process 1100 may forward the modified allocation signal to a second network device of the one or more network devices (block 1130). In some embodiments, the process 1100 can transmit the modified allocation signal by utilizing data plane signaling. In more embodiments, the scheduler in the network device may forward the modified allocation signal or the modified data packet through the data plane to the second network device.

In additional embodiments, the process 1100 can execute a second service request of the one or more service requests in the second network device based on the modified allocation signal (block 1140). In some embodiments, the second network device may further offload the remaining service requests to other network devices. In certain embodiments, process 1100 can selectively offload the services to different network devices.

Although a specific embodiment for the process 1100 for executing services by multiple network devices for carrying out the various steps, processes, methods, and operations described herein is discussed with respect to FIG. 11, any of a variety of systems and/or processes may be utilized in accordance with embodiments of the disclosure. For example, the process 1100 may ensure that the service acceleration is load balanced across different accelerators and network devices. The elements depicted in FIG. 11 may also be interchangeable with other elements of FIGS. 1-10 and FIG. 12 as required to realize a particularly desired embodiment.

Figure 12:
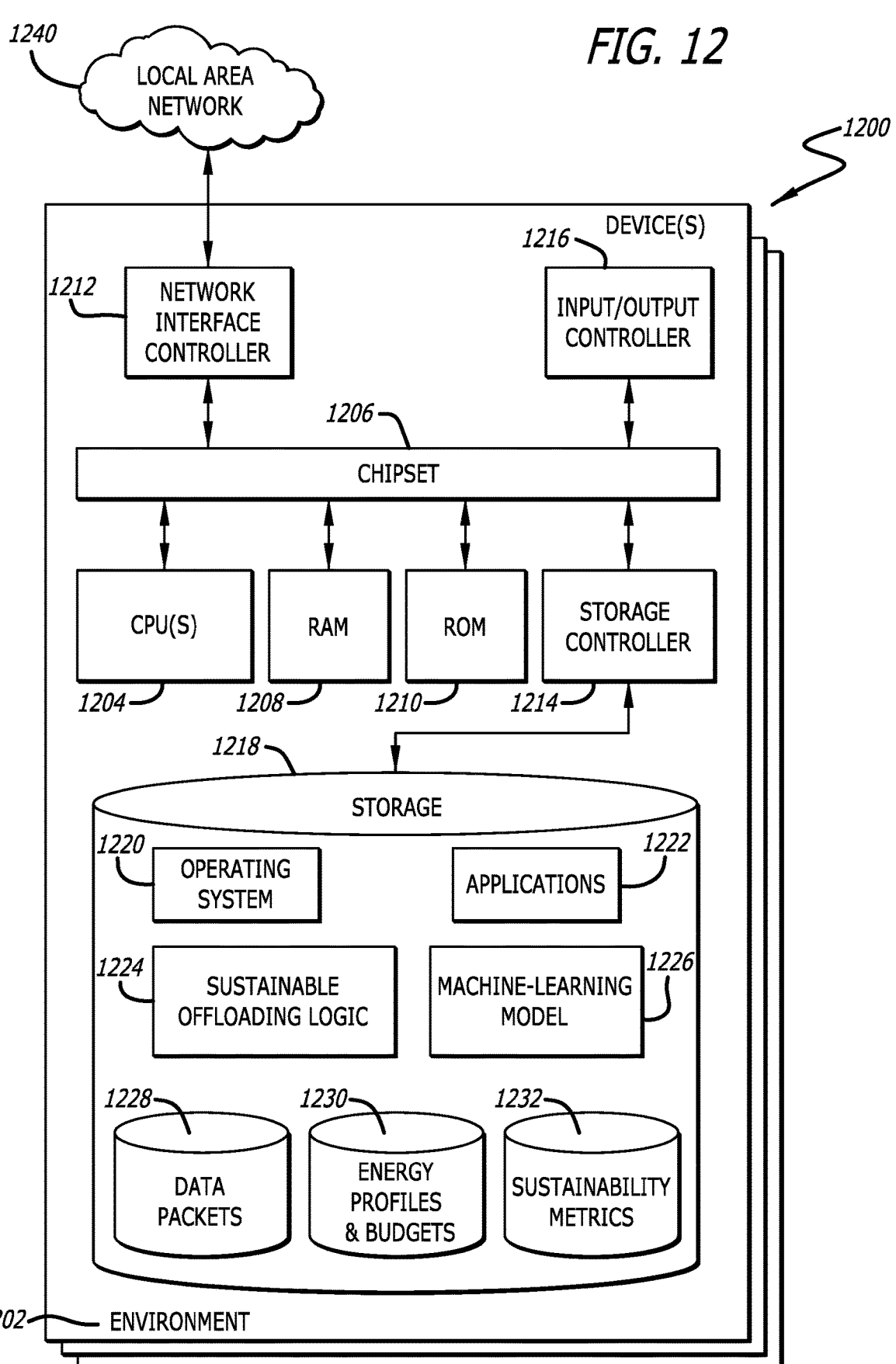
FIG. 12 is a conceptual block diagram of a device suitable for configuration with a sustainable offloading logic, in accordance with various embodiments of the disclosure.

Referring to FIG. 12, a conceptual block diagram of a device 1200 suitable for configuration with a sustainable offloading logic, in accordance with various embodiments of the disclosure is shown. The embodiment of the conceptual block diagram depicted in FIG. 12 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 12 can also illustrate an access point, a switch, or a router in accordance with various embodiments of the disclosure. The device 1200 may, in many non-limiting examples, correspond to physical devices or to virtual resources described herein.

In many embodiments, the device 1200 may include an environment 1202 such as a baseboard or "motherboard," in physical embodiments that can be configured as a printed circuit board with a multitude of components or devices connected by way of a system bus or other electrical communication paths. Conceptually, in virtualized embodiments, the environment 1202 may be a virtual environment that encompasses and executes the remaining components and resources of the device 1200. In more embodiments, one or more processors 1204, such as, but not limited to, central processing units ("CPUs") can be configured to operate in conjunction with a chipset 1206. The processor(s) 1204 can be standard programmable CPUs that perform arithmetic and logical operations necessary for the operation of the device 1200.

In a number of embodiments, the processor(s) 1204 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1206 may provide an interface between the processor(s) 1204 and the remainder of the components and devices within the environment 1202. The chipset 1206 can provide an interface to a random-access memory ("RAM") 1208, which can be used as the main memory in the device 1200 in some embodiments. The chipset 1206 can further be configured to provide an interface to a computer-readable storage medium such as a read-only memory ("ROM") 1210 or non-volatile RAM ("NVRAM") for storing basic routines that can help with various tasks such as, but not limited to, starting up the device 1200 and/or transferring information between the various components and devices. The ROM 1210 or NVRAM can also store other application components necessary for the operation of the device 1200 in accordance with various embodiments described herein.

Additional embodiments of the device 1200 can be configured to operate in a networked environment using logical connections to remote computing devices and computer systems through a network, such as the network 1240. The chipset 1206 can include functionality for providing network connectivity through a network interface card ("NIC") 1212, which may comprise a gigabit Ethernet adapter or similar component. The NIC 1212 can be capable of connecting the device 1200 to other devices over the network 1240. It is contemplated that multiple NICs 1212 may be present in the device 1200, connecting the device to other types of networks and remote systems.

In further embodiments, the device 1200 can be connected to a storage 1218 that provides non-volatile storage for data accessible by the device 1200. The storage 1218 can, for instance, store an operating system 1220, applications 1222, data packets 1228, energy profiles and budgets 1230, and sustainability metrics 1232 which are described in greater detail below. The storage 1218 can be connected to the environment 1202 through a storage controller 1214 connected to the chipset 1206. In certain embodiments, the storage 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The data packets 1228 may be received from the incoming data flow and may correspond to the one or more service requests. The energy profiles and budgets 1230 can include the maximum allowable power consumption values for the one or more processing units in the device 1200. The sustainability metrics 1232 may include the target sustainability metric indicative of the maximum allowable power consumption for the device 1200.

The device 1200 can store data within the storage 1218 by transforming the physical state of the physical storage units to reflect the information being stored. The specific transformation of physical state can depend on various factors. Examples of such factors can include, but are not limited to, the technology used to implement the physical storage units, whether the storage 1218 is characterized as primary or secondary storage, and the like.

In many more embodiments, the device 1200 can store information within the storage 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1200 can further read or access information from the storage 1218 by detecting the physical states or characteristics of one or more particular locations within the physical storage units.

In addition to the storage 1218 described above, the device 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1200. In some examples, the operations performed by a cloud computing network, and or any components included therein, may be supported by one or more devices similar to device 1200. Stated otherwise, some or all of the operations performed by the cloud computing network, and or any components included therein, may be performed by one or more devices 1200 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1218 can store an operating system 1220 utilized to control the operation of the device 1200. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1218 can store other system or application programs and data utilized by the device 1200.

In many additional embodiments, the storage 1218 or other computer-readable storage media is encoded with computer-executable instructions which, when loaded into the device 1200, may transform it from a general-purpose computing system into a special-purpose computer capable of implementing the embodiments described herein. These computer-executable instructions may be stored as application 1222 and transform the device 1200 by specifying how the processor(s) 1204 can transition between states, as described above. In some embodiments, the device 1200 has access to computer-readable storage media storing computer-executable instructions which, when executed by the device 1200, perform the various processes described above with regard to FIGS. 1-11. In certain embodiments, the device 1200 can also include computer-readable storage media having instructions stored thereupon for performing any of the other computer-implemented operations described herein.

In many further embodiments, the device 1200 may include a sustainable offloading logic 1224. The sustainable offloading logic 1224 can be configured to perform one or more of the various steps, processes, operations, and/or other methods that are described above. Often, the sustainable offloading logic 1224 can be a set of instructions stored within a non-volatile memory that, when executed by the processor(s)/controller(s) 1204 can carry out these steps, etc. In some embodiments, the sustainable offloading logic 1224 may be a client application that resides on a network-connected device, such as, but not limited to, a server, switch, personal or mobile computing device in a single or distributed arrangement. The sustainable offloading logic 1224 can offload and/or accelerate the services among the processing units in the device 1200.

In still further embodiments, the device 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can be configured to provide output to a display, such as a computer monitor, a flat panel display, a digital projector, a printer, or other type of output device. Those skilled in the art will recognize that the device 1200 might not include all of the components shown in FIG. 12 and can include other components that are not explicitly shown in FIG. 12 or might utilize an architecture completely different than that shown in FIG. 12.

As described above, the device 1200 may support a virtualization layer, such as one or more virtual resources executing on the device 1200. In some examples, the virtualization layer may be supported by a hypervisor that provides one or more virtual machines running on the device 1200 to perform functions described herein. The virtualization layer may generally support a virtual resource that performs at least a portion of the techniques described herein.

Finally, in numerous additional embodiments, data may be processed into a format usable by a machine-learning model 1226 (e.g., feature vectors), and or other pre-processing techniques. The machine-learning ("ML") model 1226 may be any type of ML model, such as supervised models, reinforcement models, and/or unsupervised models. The ML model 1226 may include one or more of linear regression models, logistic regression models, decision trees, Naïve Bayes models, neural networks, k-means cluster models, random forest models, and/or other types of ML models 1226.

The ML model(s) 1226 can be configured to generate inferences to make predictions or draw conclusions from data. An inference can be considered the output of a process of applying a model to new data. This can occur by learning from at least the data packets 1228, the energy profiles and budgets 1230 and the sustainability metrics 1232 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1226 may be generated by human/administrator verifications or may compare predicted outcomes with actual outcomes.

Although a specific embodiment for the device 1200 suitable for configuration with the sustainable offloading logic for carrying out the various steps, processes, methods, and operations described herein is discussed with respect to FIG. 12, any of a variety of systems and/or processes may be utilized in accordance with embodiments of the disclosure. For example, the device 1200 may be in a virtual environment such as a cloud-based network administration suite, or it may be distributed across a variety of network devices or switches. The elements depicted in FIG. 12 may also be interchangeable with other elements of FIGS. 1-11 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
a memory communicatively coupled to the processor; and
a sustainable offloading logic, configured to:
determine a plurality of energy profiles corresponding to a plurality of processing units;
receive one or more service requests;
assign one or more processing units from the plurality of processing units to the one or more service requests based on the plurality of energy profiles;
determine one or more state entries for the one or more processing units; and
generate an allocation signal indicative of the one or more state entries, wherein the allocation signal comprises a header field of a data-plane packet, the header field being modified by each processing unit to indicate whether the corresponding service request has been executed or skipped.

2. The device of claim 1, wherein the sustainable offloading logic is further configured to:

receive a plurality of power consumption metrics from the plurality of processing units in real-time; and generate the plurality of energy profiles corresponding to the plurality of processing units based on the plurality of power consumption metrics.

3. The device of claim 1, wherein the plurality of energy profiles are indicative of power consumption of the plurality of processing units per service request.

4. The device of claim 1, wherein the one or more state entries are indicative of a number of service requests to skip and a number or service requests to execute.

5. The device of claim 1, wherein the sustainable offloading logic is further configured to transmit the allocation signal to the one or more processing units through a data plane.

6. The device of claim 5, wherein the one or more processing units execute the one or more service requests based on the one or more state entries indicated by the allocation signal.

7. The device of claim 1, wherein the sustainable offloading logic is further configured to:

transmit the plurality of energy profiles corresponding to the plurality of processing units to a central controller; and receive the one or more state entries for the one or more processing units from the central controller.

8. The device of claim 1, wherein the sustainable offloading logic is further configured to:

determine a target sustainability metric; and determine an energy budget for each processing unit of the plurality of processing units based on the target sustainability metric.

9. The device of claim 8, wherein the sustainable offloading logic is further configured to monitor a power consumption of a processing unit in real-time.

10. The device of claim 9, wherein the sustainable offloading logic is further configured to dynamically modify the energy budget for the processing unit based on the power consumption of the processing unit.

11. The device of claim 10, wherein the sustainable offloading logic is further configured to dynamically modify a state entry of the one or more state entries for the processing unit based on the energy budget.

12. The device of claim 1, wherein the sustainable offloading logic is further configured to execute a service request of the one or more service requests.

13. The device of claim 12, wherein the sustainable offloading logic is further configured to:

modify a header of a data packet indicative of the service request; and generate a modified data packet including the header, wherein the modified data packet is indicative of execution of the service request.

14. The device of claim 13, wherein the sustainable offloading logic is further configured to:

generate a modified allocation signal comprising the modified data packet; and transmit the modified allocation signal to the one or more processing units.

15. A device, comprising:

a processor;

a memory communicatively coupled to the processor; and a sustainable offloading logic, configured to:

receive a plurality of power consumption metrics from a plurality of network devices;

determine a plurality of energy profiles corresponding to the plurality of network devices based on the plurality of power consumption metrics;

receive one or more service requests;

assign one or more network devices from the plurality of network devices to the one or more service requests based on the plurality of energy profiles;

generate an allocation signal indicative of assignment of the one or more network devices, wherein the allocation signal comprises a header field of a data-plane packet, the header field being modified by each processing unit to indicate whether the corresponding service request has been executed or skipped; and transmit the allocation signal to the one or more network devices.

16. The device of claim 15, wherein a first network device of the one or more network devices executes a first service request of the one or more service requests based on the allocation signal.

17. The device of claim 16, wherein the first network device modifies the allocation signal to generate a modified allocation signal indicative of execution of the first service request, and forwards the modified allocation signal to a second network device of the one or more network devices.

18. The device of claim 17, wherein the second network device executes a second service request of the one or more service requests based on the modified allocation signal.

19. A method comprising:

determining a plurality of energy profiles corresponding to a plurality of processing units;

receiving one or more service requests;

assigning one or more processing units from the plurality of processing units to the one or more service requests based on the plurality of energy profiles;

determining one or more state entries for the one or more processing units;

generating an allocation signal indicative of the one or more state entries, wherein the allocation signal comprises a header field of a data-plane packet, the header field being modified by each processing unit to indicate whether the corresponding service request has been executed or skipped; and transmitting the allocation signal to the one or more processing units.

20. The method of claim 19, further comprising:

determining a target sustainability metric;

determining an energy budget for each processing unit of the plurality of processing units based on the target sustainability metric; and dynamically modifying a state entry of the one or more state entries associated with a processing unit of the one or more processing units based on corresponding energy budget.

* * * * *